United States Patent
Meng et al.

(10) Patent No.: US 10,193,843 B2
(45) Date of Patent: Jan. 29, 2019

(54) COMPUTING SYSTEM WITH CONVERSATION MODELING MECHANISM AND METHOD OF OPERATION THEREOF

(71) Applicant: Samsung Electronics Co., Ltd., Suwon-si, Gyeonggi-do (KR)

(72) Inventors: Yunsong Meng, Fremont, CA (US); Doreen Cheng, San Jose, CA (US); Yongmei Shi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 378 days.

(21) Appl. No.: 14/963,171

(22) Filed: Dec. 8, 2015

(65) Prior Publication Data
US 2017/0163584 A1   Jun. 8, 2017

(51) Int. Cl.
*H04L 12/58* (2006.01)
*G06Q 10/06* (2012.01)
*G06Q 10/10* (2012.01)
*G06Q 50/00* (2012.01)

(52) U.S. Cl.
CPC ......... *H04L 51/18* (2013.01); *G06Q 10/0633* (2013.01); *G06Q 10/103* (2013.01); *G06Q 50/01* (2013.01)

(58) Field of Classification Search
CPC .. H04L 51/18; G06Q 10/0633; G06Q 10/103; G06Q 50/01
See application file for complete search history.

(56) References Cited

U.S. PATENT DOCUMENTS

| | | | |
|---|---|---|---|
| 6,560,589 B1 | 5/2003 | Stier et al. | |
| 6,727,916 B1 | 4/2004 | Ballard | |
| 6,732,140 B1 * | 5/2004 | McCue | G06F 9/5055 |
| | | | 712/25 |
| 7,065,566 B2 | 6/2006 | Menard et al. | |
| 8,478,594 B2 | 7/2013 | Stewart et al. | |
| 8,527,430 B2 | 9/2013 | Hamilton, II et al. | |
| 8,605,855 B2 | 12/2013 | Wooters | |
| 8,630,892 B2 | 1/2014 | Bhalla et al. | |
| 8,655,674 B2 | 2/2014 | Finn et al. | |
| 8,666,921 B2 | 3/2014 | Fisher, Jr. | |
| 8,781,882 B1 | 7/2014 | Arboletti et al. | |
| 2002/0123983 A1 | 9/2002 | Riley et al. | |
| 2004/0088411 A1 | 5/2004 | Jakubowski et al. | |
| 2005/0288984 A1 | 12/2005 | Hamilton | |
| 2006/0241957 A1 | 10/2006 | Boswell | |
| 2007/0019617 A1 | 1/2007 | Hancock et al. | |
| 2009/0112678 A1 | 4/2009 | Luzardo | |
| 2013/0006874 A1 | 1/2013 | Klemm | |

(Continued)

FOREIGN PATENT DOCUMENTS

EP   2779057 A1   9/2014

*Primary Examiner* — Kim T Nguyen

(57) ABSTRACT

A computing system includes: a control circuit configured to: access a subject interaction representing communication between a customer and a service provider; identify a communication segment and a sourcing party associated with the communication segment from the subject interaction; generate a message label for the communication segment based on the sourcing party; generate a dialog-flow framework based on the message label for representing the subject interaction; and a storage circuit, coupled to the control circuit, configured to store the dialog-flow framework.

20 Claims, 6 Drawing Sheets

(56) References Cited

U.S. PATENT DOCUMENTS

| | | |
|---|---|---|
| 2013/0013546 A1 | 1/2013 | Bagchi et al. |
| 2013/0054339 A1 | 2/2013 | Gupta et al. |
| 2013/0268656 A1 | 10/2013 | Bott |
| 2014/0024348 A1 | 1/2014 | Hurst et al. |
| 2014/0280152 A1 | 9/2014 | Jin |
| 2014/0280621 A1* | 9/2014 | Bourdaillet .......... G06Q 10/107 709/206 |
| 2015/0032724 A1* | 1/2015 | Thirugnanasundaram ................. G06F 17/30654 707/722 |

* cited by examiner

COMPUTING SYSTEM WITH CONVERSATION MODELING MECHANISM AND METHOD OF OPERATION THEREOF

TECHNICAL FIELD

An embodiment of the present invention relates generally to a computing system, and more particularly to a system with a conversation modeling mechanism.

BACKGROUND

Modern consumer and industrial electronics, especially devices such as computing systems, cellular phones, wearable devices such as health monitors or smart watches, and combination devices are providing increasing levels of functionality to support modern life including online social networks. Research and development in the existing technologies can take numerous different directions.

As users become more empowered with the growth in computing, various uses begin to take advantage of this new device space. There are many technological solutions to take advantage of this new device capability to provide increasing functionalities to the user. However, users often face limitations in interacting with the devices to take advantage of the technological solutions.

A good customer service is essential for business providers to maintain good relationship with customers and eventually determine the providers' market share. Even though business providers investigate a lot of money on improving customer service each year, half of customer service calls typically go unresolved or require escalation. Yet, in a large number of occurrences, the failed calls, inevitably eroding customer satisfaction, could have been resolved with better access to information. Further, it is highly desirable from customers to interface with digital assistant than to waste time in the endless waiting for the next available human agent.

Thus, a need still remains for a computing system with conversation modeling mechanism equipping the digital assistant with sufficient knowledge. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment provides a computing system, including: a control circuit configured to: access a subject interaction representing communication between a customer and a service provider; identify a communication segment and a sourcing party associated with the communication segment from the subject interaction; generate a message label for the communication segment based on the sourcing party; generate a dialog-flow framework based on the message label for representing the subject interaction; and a storage circuit, coupled to the control circuit, configured to store the dialog-flow framework.

An embodiment provides a method of operation of a computing system including: accessing a subject interaction representing communication between a customer and a service provider; identifying a communication segment and a sourcing party associated with the communication segment from the subject interaction; generating a message label for the communication segment based on the sourcing party; and generating with a control circuit a dialog-flow framework based on the message label for representing the subject interaction.

An embodiment provides a non-transitory computer readable medium including instructions for execution by a computing system to perform operations including: accessing a subject interaction representing communication between a customer and a service provider; identifying a communication segment and a sourcing party associated with the communication segment from the subject interaction; generating a message label for the communication segment based on the sourcing party; and generating a dialog-flow framework based on the message label for representing the subject interaction.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
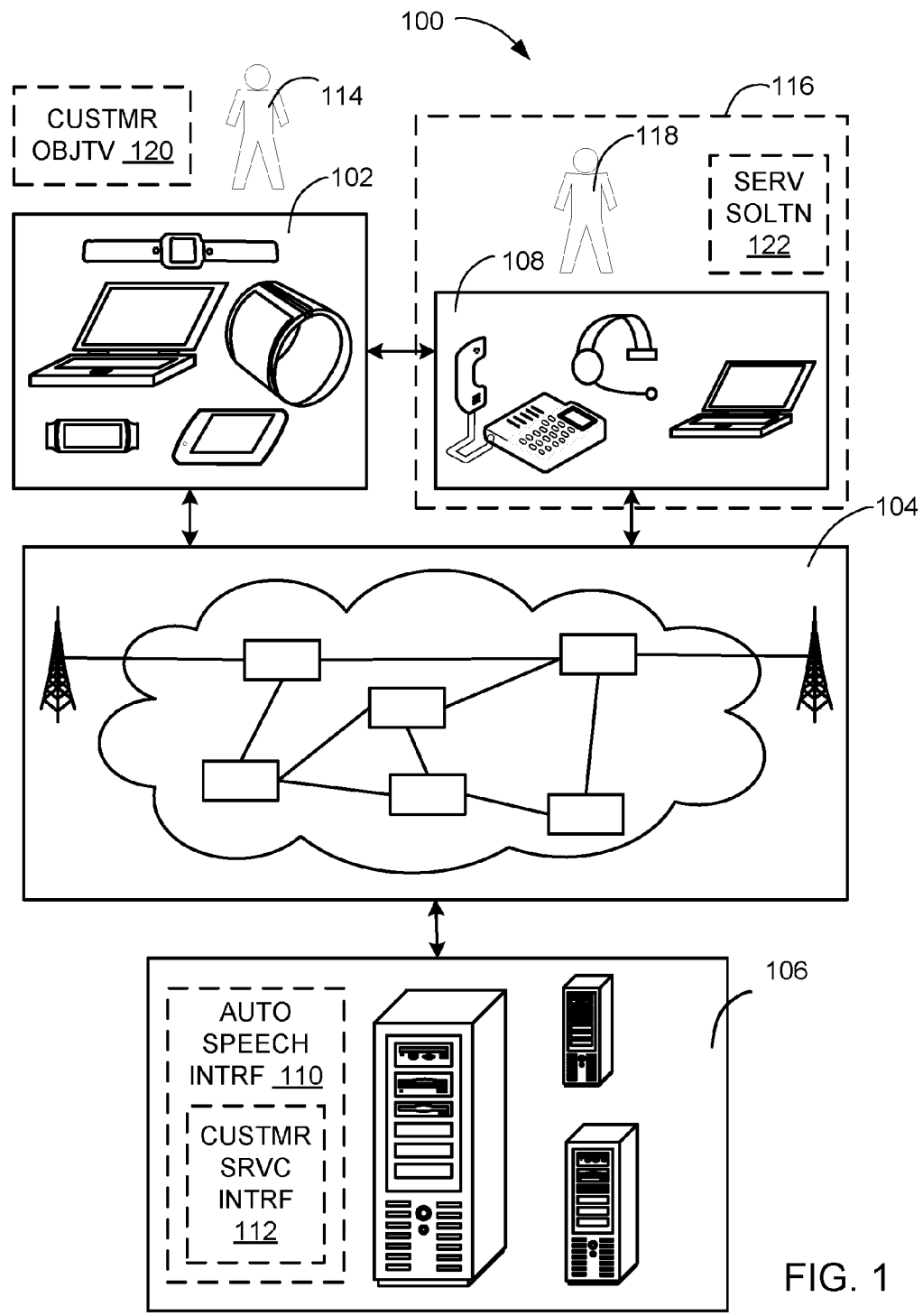
FIG. 1 is a computing system with a conversation modeling mechanism in an embodiment of the present invention.

The following embodiments of the present invention provide analysis of one or more subject interactions for automated communication interface. The one or more subject interactions can be analyzed to characterize interactions between a customer and a service provider. The analysis can generate one or more message labels categorizing one or more message segments in the subject interactions.

The message labels can be used to generate a dialog-flow framework for representing or characterizing interactions and exchanges common to the customer and the service provider. The dialog-flow framework can be further used to implement the automated communication interface in interacting with the customer for the service provider.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

Referring now to FIG. 1, therein is shown a computing system 100 with a conversation modeling mechanism in an embodiment of the present invention. The computing system 100 includes a first device 102, such as a client device, connected to a second device 106, such as a client device or server. The first device 102 can communicate with the second device 106 with a network 104, such as a wireless or wired network.

For example, the first device 102 can be of any of a variety of consumer devices, such as a cellular phone, a personal digital assistant, a notebook computer, a tablet computer, a wearable device, or other multi-functional mobile communication or entertainment device. The first device 102 can couple, either directly or indirectly, to the network 104 to communicate with the second device 106 or can be a stand-alone device.

For illustrative purposes, the computing system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the computing system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

The computing system 100 can further include a third device 108. The third device 108, such as a client or a server, can be connected to the first device 102, the second device 106, or a combination thereof. The third device 108 can be similar to the first device 102, the second device 106, or a combination thereof.

For example, the third device 108 can include any variety of consumer devices, wearable devices, servers, stationary or mobile devices, centralized or decentralized devices, or a combination thereof. The third device 108 can couple, either directly or indirectly, to the network 104 to communicate with another device, couple directly to another device, or can be a stand-alone device.

For illustrative purposes, the computing system 100 is described with the third device 108 as a mobile computing device, although it is understood that the third device 108 can be different types of devices. For example, the third device 108 can also be a non-mobile computing device, such as a server, a server farm, or a desktop computer.

Also for illustrative purposes, the computing system 100 is shown with the first device 102, the second device 106, and the third device 108 as end points of the network 104, although it is understood that the computing system 100 can have a different partition between the first device 102, the second device 106, the third device 108, and the network 104. For example, the first device 102, the second device 106, the third device 108, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The computing system 100 can include an automated communication interface 110, such as a customer service interface 112 for interacting with a customer 114. The automated communication interface 110 can include a mechanism allowing devices to interact with people through human language. For example, the automated communication interface 110 can include interactive voice response (IVR), automated attendant or receptionist, or a combination thereof.

The automated communication interface 110 can interact with people through voice or audible communication. The automated communication interface 110 can further interact with people through written communication following speech patterns of people, such as in email communications or interactive texting applications.

The customer service interface 112 is the automated communication interface 110 applied in context of obtaining or inquiring about a good or a service. The customer service interface 112 can include the IVR or the automated attendant for supporting the customer 114 who is going to acquire or who has purchased a good, a service, a membership, or a combination thereof.

The customer 114 can include a potential consumer or a purchaser of the good, the service, the membership, or a combination thereof. The customer 114 can further include a person, a party, or an entity accessing and interacting with the automated communication interface 110. The automated communication interface 110, including the customer service interface 112, can be for a service provider 116. The service provider 116 can implement or institute the automated communication interface 110 to service or address the customer 114.

For illustrative purposes, the automated communication interface 110 is shown with the second device 106. However, it is understood that the service provider 116 can be associated with the third device 108 and implement the automated communication interface 110 using the second device 106.

The service provider 116 can include an entity providing a resource or a provision to the customer 114 associated with the good, the service, the membership, or a combination thereof. The service provider 116 can include a seller of the good, the service, the membership, or a combination thereof. The service provider 116 can include an entity separate from the seller, such as a help-desk or a separate after-market servicing entity.

The service provider 116 can use the automated communication interface 110 to interact with the customer 114 in place of a service representative 118 in addressing a customer objective 120 and providing a service solution 122. The service representative 118 can include a person tasked to interact with the customer 114 to address the customer objective 120 and provide the service solution 122. The service representative 118 can represent the service provider 116.

The customer objective 120 is a goal or a motivation of the customer 114 associated with the good, the service, the membership, or a combination thereof. The customer objective 120 can include a question, an issue, a problem, a goal, or a combination thereof.

The service solution 122 is a response addressing the customer objective 120. The service solution 122 can include knowledge or information, such as an answer to a question, addressing the customer objective 120. The service solution 122 can further include an action, a notice or a status thereof, or a combination thereof addressing the customer objective 120.

As an illustrative example, the customer 114 can contact the service provider 116 to address the customer objective 120, such as to ask a question or to report an issue. The service provider 116 can address the customer objective 120 through the automated communication interface 110 or the service representative 118. The computing system 100 can further use the interaction between the customer 114 and the service representative 118 to further adjust and update the automated communication interface 110. Details regarding the processing to adjust and update the automated communication interface 110 are discussed below.

For illustrative purposes, the computing system 100 will be described using the customer service interface 112 in sales scenarios. However, it is understood that the computing system 100 can be applicable for other uses. For example, the computing system 100 can implement the automated communication interface 110 in any situation where a party corresponding to the customer 114 has an objective outside of sales or financial transactions, such as in soliciting independent information or submitting a request independent of financial transactions.

Figure 2:
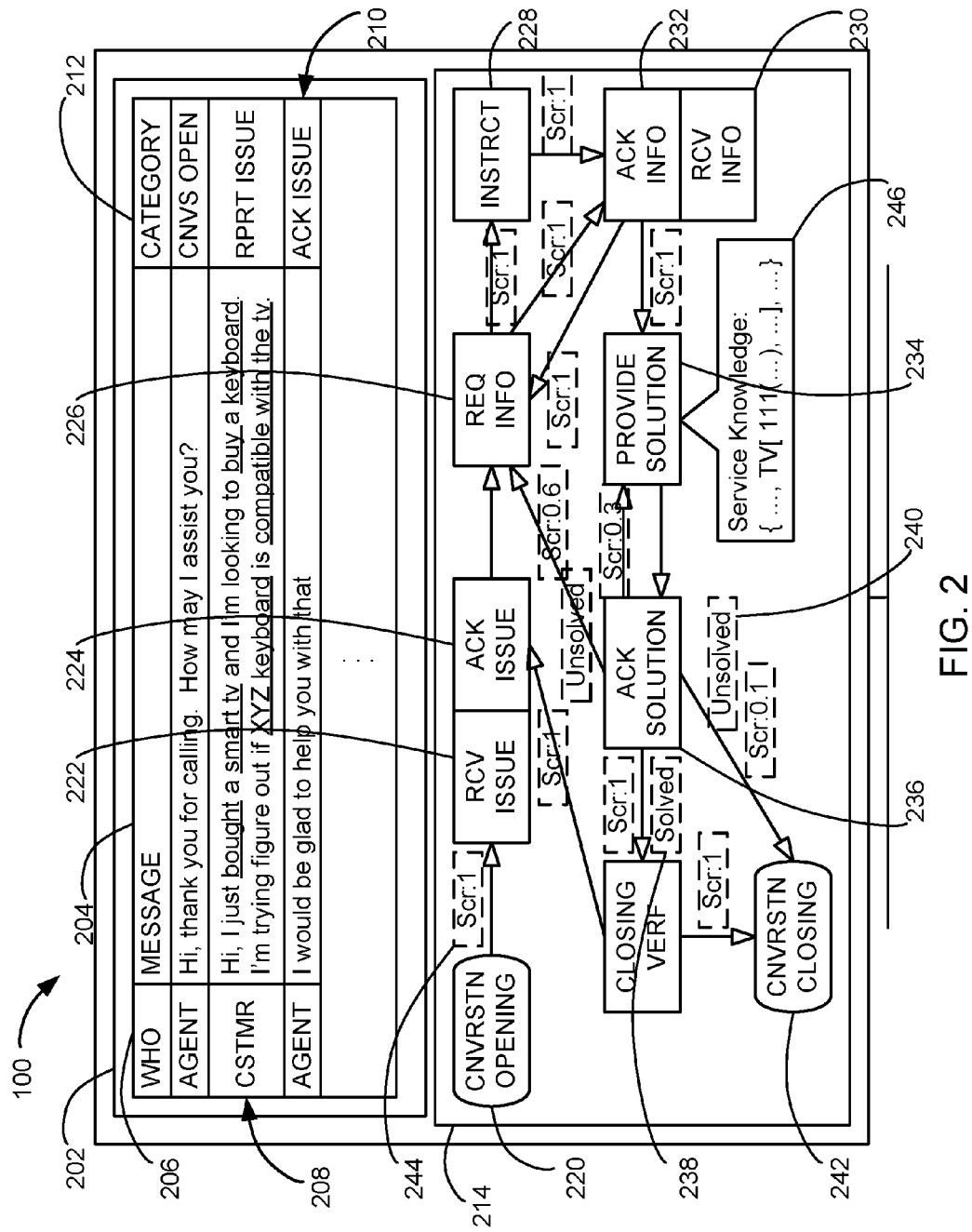
FIG. 2 is an example of a display interface of the computing system.

Referring now to FIG. 2 therein is shown an example of a display interface of the computing system 100. The computing system 100 can process a subject interaction 202. The subject interaction 202 can include one or more messages exchanged between the customer 114 of FIG. 1 and the service provider 116 of FIG. 1, including the service representative 118 of FIG. 1 or the automated communication interface 110 of FIG. 1. The subject interaction 202 can include an in-person interaction between the customer 114 and the service representative 118.

In one embodiment, the subject interaction 202 can include a live, real-time interaction occurring at the time of analysis or process regarding the subject interaction 202. In another embodiment, the subject interaction 202 can further include a text record, such as a script or a speech-to-text transcription record, of a previous interaction. The subject interaction 202 can include the one or more messages corresponding to the customer objective 120 of FIG. 1, the service solution 122 of FIG. 1, or a combination thereof.

The computing system 100 can process the subject interaction 202 for adjusting or updating the automated communication interface 110. For example, the computing system 100 can process the subject interaction 202 including analyzing a previous record or a current real-time interaction between people or between the customer 114 and the automated communication interface 110. The computing system 100 can further analyze the subject interaction 202 including training data.

The computing system 100 can process the subject interaction 202 to determine one or more instances of a communication segment 204 each associated with a sourcing party 206. The communication segment 204 is a portion of a conversation associated with one party, one thought or concept, or a combination thereof. In one embodiment, the communication segment 204 can be a phrase, a sentence, or a combination thereof continuously expressed or generated by one party. In another embodiment, the communication segment 204 can express a single thought or be associated with a single objective within the customer objective 120 or the service solution 122.

For example, the communication segment 204 can include a sentence among a series of sentences expressed or generated in alternating sequence between the customer 114 and the service representative 118. Also for example, the communication segment 204 can include a sentence among a series of sentences expressed or generated by either the customer 114 or the service representative 118.

The sourcing party 206 is identity of the party expressing or generating the corresponding communication segment 204. The sourcing party 206 can identify the originating party for the communication segment 204. For subject interaction 202 associated with the customer service interface 112 of FIG. 1, the sourcing party 206 can include the customer 114, the service representative 118, or a combination thereof. For example, the communication segment 204 can include a customer-sourced message 208 expressed or generated by the customer 114, a service-sourced message 210 expressed or generated by the service representative 118, or a combination thereof.

The computing system 100 can further process the subject interaction 202 to generate a message label 212. The computing system 100 can generate the message label 212 corresponding to the communication segment 204. The message label 212 is a categorization or classification associated with originating party's objective or intent for corresponding segment.

The message label 212 can categorize or classify the corresponding communication segment 204 according to a meaning, an objective of the message segment, dialogue state according to some workflow, or a combination thereof. For example, the message label 212 can identify greeting, verification, communication of specific type of information, or a combination thereof.

The computing system 100 can generate the message label 212 based on a dialog-flow framework 214. The dialog-flow framework 214 is a set of patterns representing communication between parties. The dialog-flow framework 214 can include a pattern encompassing all or a majority of communications exchanged in a continuous conversation. The dialog-flow framework 214 can include the pattern specific to a type or a category of conversation, such as for the customer service interface 112. The dialog flow framework can be represented as a set of flows or in a compact model like automatons.

The dialog-flow framework 214 can identify various combination or sequence of the message label 212. The dialog-flow framework 214 can identify a connection or a pattern between the message label 212 and the sourcing party 206, a sequence thereof, or a combination thereof.

For example, the dialog-flow framework 214 can include a flow chart of a typical or a representative conversation. Also for example, the dialog-flow framework 214 can include a state transition mechanism. As a more specific example, the dialog-flow framework 214 for the automated communication interface 110, including the customer service interface 112, can include a conversation opening 220, an issue report 222, an issue acknowledgement 224, an information request 226, an instruction delivery 228, an information communication 230, an information acknowledgement 232, a solution communication 234, a solution acknowledgement 236, a conversation closing 242, or a combination thereof.

The conversation opening 220 can include a greeting or an initiation for the subject interaction 202. The conversation opening 220 can be a first instance of the communication segment 204 in the subject interaction 202. In one embodiment, the conversation opening 220 can be the communication segment 204 generated or expressed by the service representative 118. The conversation opening 220 can include greeting, identification of the service provider 116 of FIG. 1 or the service representative 118, standardized phrases, or a combination thereof.

The issue report 222 can include identification of the customer objective 120 of the subject interaction 202. The issue report 222 can include a segment subsequent or directly related to the conversation opening 220.

The issue report 222 can also be the segment generated or expressed by the customer 114. For example, the issue report 222 can include the first segment generated or expressed by the customer 114, the segment following an exchange of greetings, the segment following a specific phrase from the service representative 118, or a combination thereof. The issue report 222 can include specific words or expressions associated with a service, a product, a function, or a combination thereof corresponding to the service provider 116.

The issue acknowledgement 224 can include an affirmation of receipt or understanding of the customer objective 120. The issue acknowledgement 224 can include a segment subsequent or directly related to the issue report 222. The issue acknowledgement 224 can be generated or expressed by the service provider 116 in response to the issue report 222 or after hearing or receiving the issue report 222 from the customer 114.

The issue acknowledgement 224 can include a word or a phrase associated with an affirmation or expression of understanding. The issue acknowledgement 224 can further include a repetition of the customer objective 120 or a portion therein. The issue acknowledgement 224 can further be optional or implied, with the information request 226, the instruction delivery 228, the solution communication 234, or a combination thereof following the issue report 222 without explicit instance of the issue acknowledgement 224.

The information request 226 can include an inquiry of additional information associated with or necessary for the customer objective 120. The information request 226 can include a segment subsequent or directly related to the issue report 222, the issue acknowledgement 224, the solution acknowledgement 236, or a combination thereof.

The information request 226 can be generated or expressed by the service provider 116 in response to the issue report 222 or a negative instance of the solution acknowledgement 236. The information request 226 can further be optional, with the solution communication 234 following the issue report 222 without explicit instance of the information request 226.

The information request 226 can include a request for additional detailed information, such as part number, identification information, status or state information, or a combination thereof. The information request 226 can further include a request for correction or adjustment associated with the solution communication 234. The information request 226 can include specific information or category of information related or corresponding to the specific words or expressions associated with a service, a product, a function, or a combination thereof specific to the service provider 116 as included in the customer objective 120.

The instruction delivery 228 can include a segment of auxiliary information associated with or helpful for complying with the information request 226. The instruction delivery 228 can include a segment subsequent or directly coupled to the information request 226. The instruction delivery 228 can be generated or expressed by the service representative 118 in response to the information request 226. The instruction delivery 228 can further be optional, with the information communication 230 or a negative affirmation associated with the information communication 230 following the information request 226 without explicit instance of the instruction delivery 228.

The instruction delivery 228 can include information or guidance associated with obtaining the additional information sought by the information request 226. The instruction delivery 228 can include instructions for the customer 114 in obtaining the additional information detail requested through the information request 226. The customer 114 can use the instruction delivery 228 for the information communication 230.

The information communication 230 can include a communication of the additional information associated with or necessary for the customer objective 120, an acknowledgement, or a combination thereof. The information communication 230 can be the information in response to the information request 226. The information communication 230 can include a segment subsequent or directly coupled to the information request 226, the instruction delivery 228, or a combination thereof. The information communication 230 can be generated or expressed by the customer 114 in response to the information request 226.

The information communication 230 can include a confirmation or acknowledgement, positive or negative, for a question included in the information request 226. The information communication 230 can further include the additional information or detail as requested by the information request 226.

The information acknowledgement 232 can include an affirmation of receipt or understanding of the information communication 230. The information acknowledgement 232 can include a segment subsequent or directly related to the information communication 230. The information acknowledgement 232 can be generated or expressed by the service provider 116 in response to the information communication 230.

The information acknowledgement 232 can include a word or a phrase associated with an affirmation or expression of understanding. The information acknowledgement 232 can further include a repetition of the information communication 230 or a portion therein. The information acknowledgement 232 can further be optional or implied, with the information request 226, the solution communication 234, or a combination thereof following the information communication 230 without explicit instance of the information acknowledgement 232.

Based on the information communication 230, the subject interaction 202 can include dialog for repeating the information request 226 after the information communication 230. The dialog-flow framework 214 can represent the repeat or a loop using a feedback arrow from the information acknowledgement 232, the information communication 230, or a combination thereof to the information request 226.

The solution communication 234 can include communication of the service solution 122 or a candidate thereof. The solution communication 234 can include a segment subsequent or directly related to the issue report 222, the issue acknowledgement 224, the information communication 230, the information acknowledgement 232, or a combination thereof.

The solution communication 234 can be generated or expressed by the service provider 116 ultimately in response to the issue report 222. The solution communication 234 can be in response to the issue report 222 including all or a threshold amount of necessary information for the customer objective 120. The solution communication 234 can further be in response to the information communication 230 satisfying the threshold amount of necessary information for the customer objective 120. The solution communication 234 can include a word, a phrase, content, or a combination thereof addressing the customer objective 120.

The solution acknowledgement 236 can include an evaluation of the solution communication 234 in comparison to the customer objective 120. The solution acknowledgement 236 can include content communicating whether the solution communication 234 accurately or satisfactorily addressed the customer objective 120. The solution acknowledgement 236 can include a segment subsequent or directly related to the solution communication 234.

The solution acknowledgement 236 can be generated or expressed by the customer 114 in response to the solution communication 234 or the service solution 122 from the service provider 116 or the service representative 118. The solution acknowledgement 236 can include a word or a phrase associated with an affirmation or expression of understanding or satisfaction.

The solution acknowledgement 236 can further include a word or a phrase associated with dissatisfaction or negative evaluation of the solution communication 234 or the service solution 122. Based on the dissatisfaction or negative evaluation for the information communication 230, the subject interaction 202 can include dialog for repeating the information request 226 after the solution acknowledgement 236.

The computing system 100 can generate an issue solved status 238 or an issue unresolved status 240 based on the solution acknowledgement 236. The issue solved status 238 and the issue unresolved status 240 can be based on the customer-sourced message 208 from the customer 114.

The issue solved status 238 can represent a match between the customer objective 120 and a candidate for the service solution 122, a satisfaction of the customer objective 120, or a combinations thereof. The issue unresolved status 240 can represent a mismatch between the customer objective 120 and the candidate of the service solution 122, a dissatisfaction of the customer objective 120, or a combinations thereof.

The information request 226 can follow the solution acknowledgement 236 based on the issue unresolved status 240. The dialog-flow framework 214 can repeat a sequence of the message label 212 for providing a different candidate of the service solution 122 satisfying the customer objective 120. The conversation closing 242 can follow the solution acknowledgement 236 based on the issue solved status 238.

The conversation closing 242 can include a greeting or a conclusion for the subject interaction 202. The conversation closing 242 can be a last instance of the communication segment 204 in the subject interaction 202. The conversation closing 242 can also be the communication segment 204 generated or expressed by the service representative 118, the customer 114, or a combination thereof. The conversation closing 242 can include greeting, identification of the service provider 116 or the service representative 118, standardized phrases, or a combination thereof.

The dialog-flow framework 214 can represent the repeat or a loop using a feedback arrow from the solution to the information request 226. The dialog-flow framework 214 can represent the repeat or a loop associated with gathering additional information to update or adjust the service solution 122 in an additional attempt to provide a satisfactory response to the customer objective 120.

The subject interaction 202 can include other instances or types of the communication segment 204 or in different order. For example, the subject interaction 202 can include exchange of greetings by parties separate from stating the customer objective 120. Also for example, the subject interaction 202 can include reaffirmation, repeated confirmations or information, adjusted information, or a combination thereof exchanged between parties.

The computing system 100 can generate the dialog-flow framework 214 based on one or more instances of the subject interaction 202. The computing system 100 can generate the dialog-flow framework 214 for characterizing or representing various interactions or communication sessions for the service provider 116.

The computing system 100 can generate the dialog-flow framework 214 for representing a common or a typical pattern of interactions or communications for the service provider 116. The computing system 100 can generate the dialog-flow framework 214 based on processing keywords, determining patterns or groupings, a sequence thereof, or a combination thereof.

The computing system 100 can generate the dialog-flow based on maintaining a transition mechanism, and then determining a current state depending on previous conversation. The first part for the transition mechanism can be human generated or automatically generated. The second part for the current state can be based on linguistic features, such as key words, n-grams, sentence structure, sentence semantics, or a combination thereof.

The computing system 100 can generate the dialog-flow framework 214 including a transition score 244. The transition score 244 is a representation of preference associated with a change from one instance of the message label 212 to another. The transition score 244 can include a conditional probabilistic aspect, such that given the current state, the transition score 244 can represent probabilistic of transitioning to a different state.

The transition score 244 can represent a desirability for further communication with the customer 114 and/or the service representative 118, corresponding to an outcome of the communication segment 204. The outcome can be represented by one or more instances of the communication segment 204 subsequent to a subject segment or a current segment. The transition score 244 can include any real number [0, 1].

For example, the transition score 244 associated with repeating the message label 212 within a sequence of the dialog-flow framework 214 and moving back toward the conversation opening 220 can be lower than the transition score 244 associated with moving forward toward the conversation closing 242 and the issue solved status 238. As a more specific example, the transition score 244 for transitioning to a new instance of the message label 212, the transition score 244 associated with the issue solved status 238, or a combination thereof can be equal to or greater than 1.

Also as a more specific example, the transition score 244 for repeating the message label 212, the transition score 244 associated with the issue unresolved status 240, or a combination thereof can be less than 1. Also as a more specific example, the transition score 244 from the solution acknowledgement 236 to the information request 226 can be lower than the transition score 244 for a further transition from the solution acknowledgement 236 to the conversation closing 242.

The computing system 100 can further use the dialog-flow framework 214 to implement, adjust, or a combination thereof, the automated communication interface 110. The computing system 100 can generate the dialog-flow framework 214 to include recognizable triggers, patterns, markers, or a combination thereof in the customer-sourced message 208. The computing system 100 can further respond to customer-sourced message 208 based on the dialog-flow framework 214 and the recognized triggers, patterns, markers, or a combination thereof.

For example, the computing system 100 can generate the dialog-flow framework 214 based on analyzing information or conditions preceding a change between instances of the message label 212. The computing system 100 can generate the dialog-flow framework 214 including the information or conditions as triggers, patterns, markers, or a combination thereof for a preceding instance of the message label 212 to transition to a subsequent instance of the message label 212.

The computing system 100 can generate the dialog-flow framework 214 associated with a service information model 246. The service information model 246 can include a network of knowledge for one or more products, services, or a combination thereof associated with the service provider 116. The service information model 246 can include the knowledge for providing the service solution 122 addressing the customer objective 120.

The service information model 246 can include information, a likely connection between different information, or a combination thereof for the one or more products, services, or a combination thereof associated with the service provider 116. The computing system 100 can determine the service information model 246 in a variety of ways.

For example, the service information model 246 can be predetermined by the computing system 100. Also for example, the service information model 246 can be determined based on accessing information from a separate provider, including accessing an internal memory location or an external resource.

Also for example, the computing system 100 can generate the service information model 246 based on generating customer service knowledge graph, performing product malfunction analysis, performing answer effectiveness analysis, or a combination thereof.

As a more specific example, the computing system 100 can generate the service information model 246 using a machine-learning mechanism or a pattern recognition mechanism, data mining mechanism, statistical analysis, or a combination thereof. The computing system 100 can analyze the subject interaction, customer service documents, such as scripts used by the service representative 118, advertisement material, product specification, service agreements, contracts, orders, or a combination thereof to generate the service information model 246.

Also for example, the computing system 100 can use a similar method or process to update the service information model 246. The computing system 100 can use the machine-learning mechanism or the pattern recognition mechanism, the data mining mechanism, the statistical analysis, or a combination thereof to recognize and extract relevant information from one or more instance of the communication segment 204 from one or more instances of the subject interaction 202. The computing system 100 can further use the machine-learning mechanism or the pattern recognition mechanism, the data mining mechanism, the statistical analysis, or a combination thereof to analyze malfunctions or issues corresponding to the customer objective 120, answers or information addressing the customer objective 120 for the service solution 122, evaluation of effective of the service solution 122, or a combinations thereof.

The dialog-flow framework 214 can include the service information model 246. The dialog-flow framework 214 can further interact with or utilize the service information model 246 to provide the service solution 122 using the automated communication interface 110. The details regarding generation and application of the dialog-flow framework 214 are discussed below.

Figure 3:
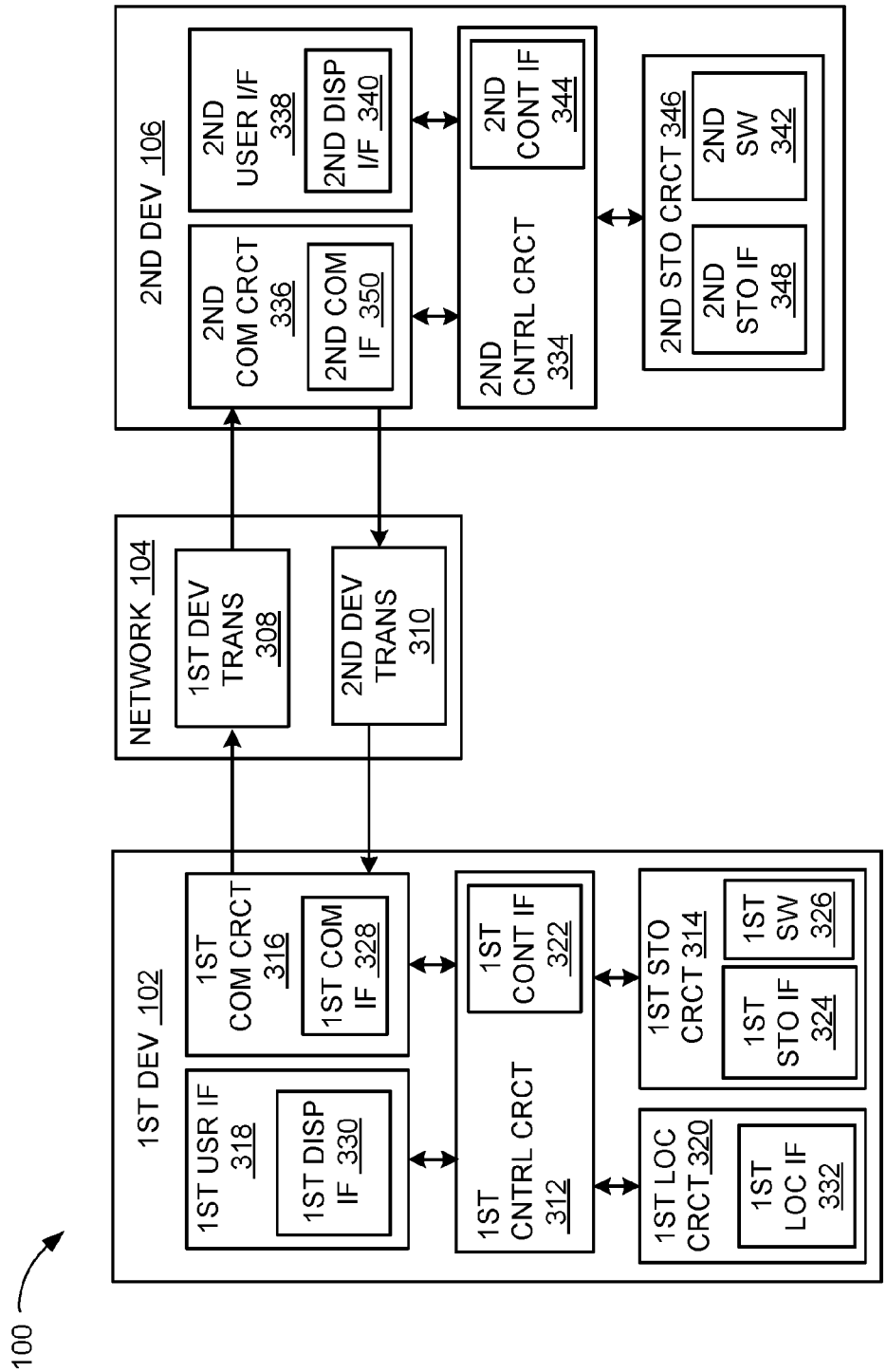
FIG. 3 is an exemplary block diagram of the computing system.

Referring now to FIG. 3 therein is shown an exemplary block diagram of the computing system 100. The computing system 100 can include the first device 102, the network 104, and the second device 106. The first device 102 can send information in a first device transmission 308 over the network 104 to the second device 106. The second device 106 can send information in a second device transmission 310 over the network 104 to the first device 102.

For illustrative purposes, the computing system 100 is shown with the first device 102 as a client device, although it is understood that the computing system 100 can have the first device 102 as a different type of device. For example, the first device 102 can be a relay device.

Also for illustrative purposes, the computing system 100 is shown with the second device 106 as a mobile device, a computing device, an appliance, or a combination thereof, although it is understood that the computing system 100 can have the second device 106 as a different type of device.

For brevity of description, in this embodiment of the present invention, the first device 102 will be described as a client device and the second device 106 will be described as a mobile device, a computing device, an appliance, a wearable device, or a combination thereof. Embodiments of the present invention are not limited to this selection for the type of devices. The selection is an example of the embodiments of the present invention.

The first device 102 can include a first control circuit 312, a first storage circuit 314, a first communication circuit 316, a first user interface 318, a location circuit 320, or a combination thereof. The first control circuit 312 can include a first control interface 322. The first control circuit 312 can execute a first software 326 to provide the instructions for operation of the computing system 100. The first control circuit 312 can be implemented in a number of different manners.

For example, the first control circuit 312 can be a processor, an embedded processor, a microprocessor, a hardware control logic, a hardware finite state machine (FSM), a digital signal processor (DSP), or a combination thereof. As a more specific example, the first control circuit 312 can include a processor, an embedded processor, a microprocessor, a hardware control logic, a hardware FSM, a DSP, or a combination thereof configured generally to execute or implement any software or instruction. Also as a more specific example, the first control circuit 312 can include circuitry, such as a hardware FSM, a DSP, FPGA, digital logic, or a combination thereof configured specifically in hardware to execute or implement one or more functions.

The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location circuit 320 can generate a location information, a heading, an acceleration, and a speed of the first device 102, as examples. The location circuit 320 can be implemented in many ways. For example, the location circuit 320 can function as at least a part of a global positioning system (GPS), an inertial navigation system such as a gyroscope, an accelerometer, a magnetometer, a compass, a spectrum analyzer, a beacon, a cellular-tower location system, a pressure location system, or any combination thereof.

The location circuit 320 can include a location interface 332. The location interface 332 can be used for communication between the location circuit 320 and other functional units or circuits in the first device 102. The location interface 332 can also be used for communication that is external to the first device 102.

The location interface 332 can receive information from the other functional units/circuits or from external sources, or can transmit information to the other functional units/circuits or to external destinations. The external sources and the external destinations refer to sources and destinations external to the first device 102.

The location interface 332 can include different implementations depending on which functional units/circuits or external units/circuits are being interfaced with the location circuit 320. The location interface 332 can be implemented with technologies and techniques similar to the implementation of the first control interface 322.

The first storage circuit 314 can store the first software 326. The first storage circuit 314 can also store relevant information, such as advertisements, biometric information, points of interest (POIs), navigation routing entries, reviews/ratings, feedback, or any combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the location circuit 320 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first storage interface 324, the first control interface 322, the first communication interface 328, the first display interface 330, the first location interface 332, or a combination thereof can access the first software 326 or one or more instructions therein. The various interfaces can configure the hardware circuits to implement or execute the loaded instructions.

For example, the first control circuit 312 can be configured and implement or execute the instruction in the first software 326 accessed or loaded through the first control interface 322 and the first storage interface 324. Also for example, the first communication circuit 316 can be configured or set in a specific manner according to configurations or settings stored in the first storage unit 314 and accessed by the first communication interface 328, the first storage interface 324, or a combination thereof.

The first communication circuit 316 can enable external communication to and from the first device 102. For example, the first communication circuit 316 can permit the first device 102 to communicate with the second device 106 of FIG. 1, an attachment, such as a peripheral device or a notebook computer, and the network 104.

The first communication circuit 316 can also function as a communication hub allowing the first device 102 to function as part of the network 104 and not limited to be an end point or terminal unit/circuit to the network 104. The first communication circuit 316 can include active and passive components, such as microelectronics or an antenna, for interaction with the network 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a sensor, a signal generator, a microphone or any combination thereof to provide data and communication inputs.

The first user interface 318 can include a first display interface 330. The first display interface 330 can include a display, a projector, a video screen, a speaker, or any combination thereof.

The first control circuit 312 can operate the first user interface 318 to display information generated by the computing system 100. The first control circuit 312 can also execute the first software 326 for the other functions of the computing system 100, including receiving location information from the location circuit 320. The first control circuit 312 can further execute the first software 326 for interaction with the network 104 via the first communication circuit 316.

The second device 106 can be optimized for implementing the various embodiments in a multiple device embodiment with the first device 102. The second device 106 can provide the additional or higher performance processing power compared to the first device 102. The second device 106 can include a second control circuit 334, a second communication circuit 336, and a second user interface 338.

The second user interface 338 allows the user to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control circuit 334 can execute a second software 342 to provide the intelligence of the second device 106 of the computing system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the computing system 100, including operating the second communication circuit 336 to communicate with the first device 102 over the network 104.

The second control circuit 334 can be implemented in a number of different manners. For example, the second control circuit 334 can be a processor, an embedded processor, a microprocessor, a hardware control logic, a hardware finite state machine (FSM), a digital signal processor (DSP), or a combination thereof. As a more specific example, the second control circuit 334 can include a processor, an embedded processor, a microprocessor, a hardware control logic, a hardware FSM, a DSP, or a combination thereof configured generally to execute or implement any software or instruction. Also as a more specific example, the second control circuit 334 can include circuitry, such as a hardware FSM, a DSP, FPGA, digital logic, or a combination thereof configured specifically in hardware to execute or implement one or more functions.

The second control circuit 334 can include a second controller interface 344. The second controller interface 344 can be used for communication between the second control circuit 334 and other functional units or circuits in the second device 106. The second controller interface 344 can also be used for communication that is external to the second device 106.

The second controller interface 344 can receive information from the other functional units/circuits or from external sources, or can transmit information to the other functional units/circuits or to external destinations. The external sources and the external destinations refer to sources and destinations external to the second device 106.

The second controller interface 344 can be implemented in different ways and can include different implementations depending on which functional units/circuits or external units/circuits are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage circuit 346 can store the second software 342. The second storage circuit 346 can also store the relevant information, such as advertisements, biometric information, points of interest, navigation routing entries, reviews/ratings, feedback, or any combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the computing system 100 is shown with the second storage circuit 346 as a single hierarchy storage system, although it is understood that the computing system 100 can have the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the location circuit 320 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second controller interface 344.

The second storage interface 348, the second control interface 344, the second communication interface 350, the second display interface 340, or a combination thereof can access the second software 342 or one or more instructions therein. The various interfaces can configure the hardware circuits to implement or execute the loaded instructions.

For example, the second control circuit 334 can be configured and implement or execute the instruction in the second software 342 accessed or loaded through the second control interface 344 and the second storage interface 348. Also for example, the second communication circuit 336 can be configured or set in a specific manner according to configurations or settings stored in the second storage unit 346 and accessed by the second communication interface 336, the second storage interface 348, or a combination thereof.

The second communication circuit 336 can enable external communication to and from the second device 106. For example, the second communication circuit 336 can permit the second device 106 to communicate with the first device 102 over the network 104.

The second communication circuit 336 can also function as a communication hub allowing the second device 106 to function as part of the network 104 and not limited to be an end point or terminal unit/circuit to the network 104. The second communication circuit 336 can include active and passive components, such as microelectronics or an antenna, for interaction with the network 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second controller interface 344.

The first communication circuit 316 can couple with the network 104 to send information to the second device 106 in the first device transmission 308. The second device 106 can receive information in the second communication circuit 336 from the first device transmission 308 of the network 104.

The second communication circuit 336 can couple with the network 104 to send information to the first device 102 in the second device transmission 310. The first device 102 can receive information in the first communication circuit 316 from the second device transmission 310 of the network 104. The computing system 100 can be executed by the first control circuit 312, the second control circuit 334, or a combination thereof.

For illustrative purposes, the second device 106 is shown with the partition having the second user interface 338, the second storage circuit 346, the second control circuit 334, and the second communication circuit 336, although it is understood that the second device 106 can have a different partition. For example, the second software 342 can be partitioned differently such that some or all of its function can be in the second control circuit 334 and the second communication circuit 336. Also, the second device 106 can include other functional units or circuits not shown in FIG. 4 for clarity.

The functional units or circuits in the first device 102 can work individually and independently of the other functional units or circuits. The first device 102 can work individually and independently from the second device 106 and the network 104.

The functional units or circuits in the second device 106 can work individually and independently of the other functional units or circuits. The second device 106 can work individually and independently from the first device 102 and the network 104.

For illustrative purposes, the computing system 100 is described by operation of the first device 102 and the second device 106. It is understood that the first device 102 and the second device 106 can operate any of the circuits and functions of the computing system 100. For example, the first device 102 is described to operate the location circuit 320, although it is understood that the second device 106 can also operate the location circuit 320.

Figure 4:
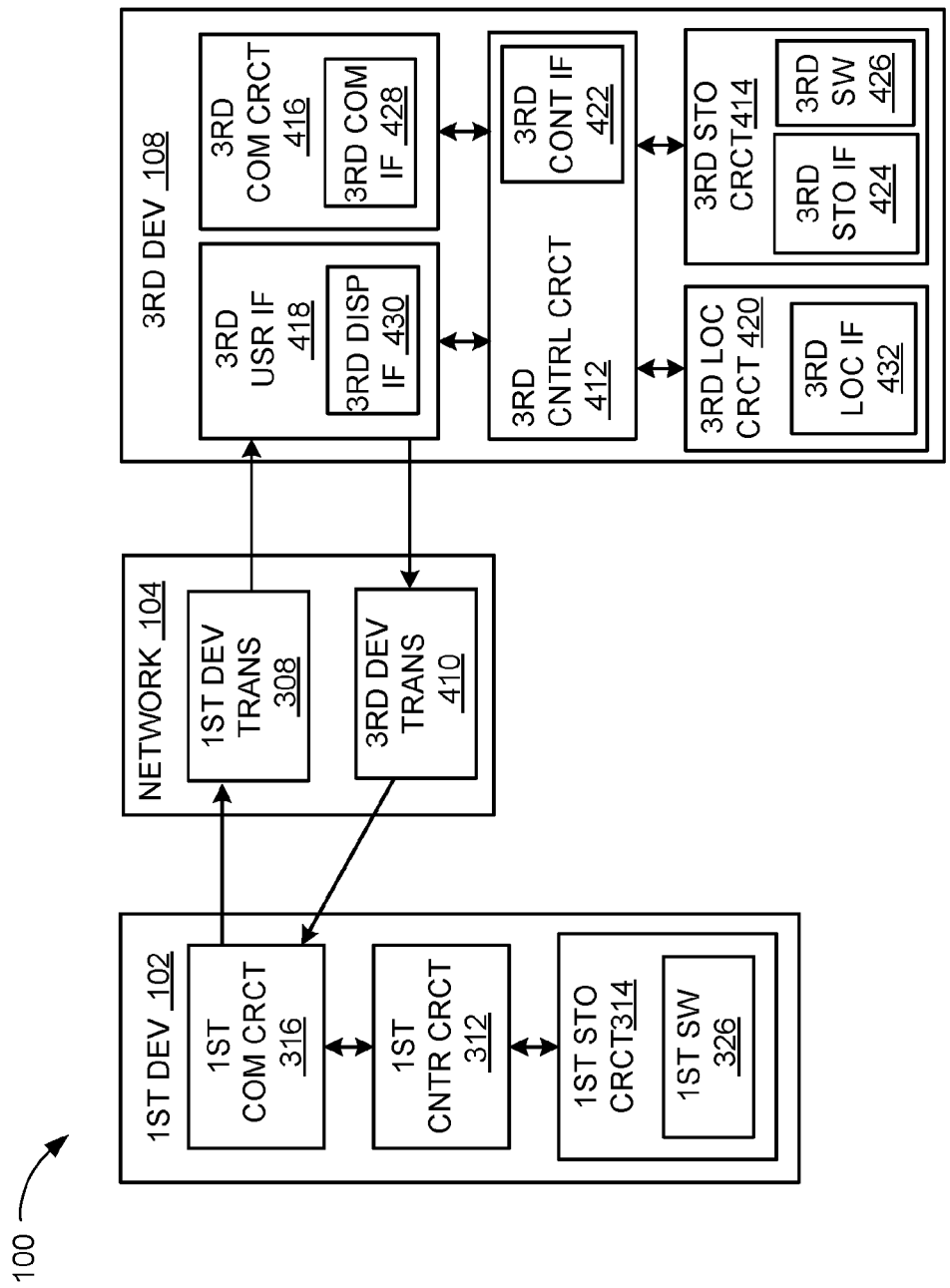
FIG. 4 is a further exemplary block diagram of the computing system.

Referring now to FIG. 4, therein is shown a further exemplary block diagram of the computing system 100. Along with the first device 102 and the second device 106 of FIG. 3, the computing system 100 can include the third device 108. The first device 102 can send information in the first device transmission 308 over the network 104 to the third device 108. The third device 108 can send information in a third device transmission 410 over the network 104 to the first device 102, the second device 106, or a combination thereof.

For illustrative purposes, the computing system 100 is shown with the third device 108 as a client device, although it is understood that the computing system 100 can have the third device 108 as a different type of device. For example, the third device 108 can be a server.

Also for illustrative purposes, the computing system 100 is shown with the first device 102 communicating with the third device 108. However, it is understood that the second device 106, or a combination thereof can also communicate with the third device 108 in a similar manner as the communication between the first device 102 and the second device 106.

For brevity of description in this embodiment of the present invention, the third device 108 will be described as a client device. The embodiment of the present invention is not limited to this type of devices. The selection is an example of an embodiment of the present invention.

The third device 108 can be optimized for implementing an embodiment of the present invention in a multiple device or multiple user embodiments with the first device 102. The third device 108 can provide the additional or specific functions compared to the first device 102, the second device 106, or a combination thereof. The third device 108 can further be a device owned or used by a separate user different from the user of the first device 102.

The third device 108 can include a third control circuit 412, a third storage circuit 414, a third communication circuit 416, a third user interface 418, a third location circuit 420, or a combination thereof. The third control circuit 412 can include a third control interface 422. The third control circuit 412 can execute a third software 426 to provide the instructions for operation of the computing system 100.

The third control circuit 412 can be implemented in a number of different manners. For example, the third control circuit 412 can be a processor, an application specific integrated circuit (ASIC) an embedded processor, a microprocessor, a hardware control logic, a hardware finite state machine (FSM), a digital signal processor (DSP), or a combination thereof. As a more specific example, the third control circuit 412 can include a processor, an embedded processor, a microprocessor, a hardware control logic, a hardware FSM, a DSP, or a combination thereof configured generally to execute or implement any software or instruction. Also as a more specific example, the third control circuit 412 can include circuitry, such as a hardware FSM, a DSP, FPGA, digital logic, or a combination thereof configured specifically in hardware to execute or implement one or more functions.

The third control interface 422 can be used for communication between the third control circuit 412 and other functional units or circuits in the third device 108. The third control interface 422 can also be used for communication that is external to the third device 108.

The third control interface 422 can receive information from the other functional units/circuits or from external sources, or can transmit information to the other functional units/circuits or to external destinations. The external sources and the external destinations refer to sources and destinations external to the third device 108.

The third control interface 422 can be implemented in different ways and can include different implementations depending on which functional units/circuits or external units/circuits are being interfaced with the third control interface 422. For example, the third control interface 422 can be implemented with a pressure sensor, an inertial sensor, a microelectromechanical system (MEMS), optical circuitry, waveguides, wireless circuitry, wireline circuitry, or a combination thereof.

The third storage circuit 414 can store the third software 426. The third storage circuit 414 can also store the relevant information, such as data representing incoming images, data representing previously presented image, sound files, or a combination thereof.

The third storage circuit 414 can be a volatile memory, a nonvolatile memory, an internal memory, an external memory, or a combination thereof. For example, the third storage circuit 414 can be a nonvolatile storage such as non-volatile random access memory (NVRAM), Flash memory, disk storage, or a volatile storage such as static random access memory (SRAM). Also for example, the third storage circuit 414 can be distribution of storage elements, multiple hierarchy storage system including different levels of caching, main memory, rotating media, or off-line storage, or a combination thereof.

The third storage circuit 414 can include a third storage interface 424. The third storage interface 424 can be used for communication between the third storage circuit 414 and other functional units or circuits in the third device 108. The third storage interface 424 can also be used for communication that is external to the third device 108.

The third storage interface 424 can receive information from the other functional units/circuits or from external sources, or can transmit information to the other functional units/circuits or to external destinations. The external sources and the external destinations refer to sources and destinations external to the third device 108.

The third storage interface 424 can include different implementations depending on which functional units/circuits or external units/circuits are being interfaced with the third storage circuit 414. The third storage interface 424 can be implemented with technologies and techniques similar to the implementation of the third control interface 422.

The third storage interface 424, the third control interface 422, the third communication interface 428, the third display interface 430, the third location interface 432, or a combination thereof can access the third software 426 or one or more instructions therein. The various interfaces can configure the hardware circuits to implement or execute the loaded instructions.

For example, the third control circuit 412 can be configured and implement or execute the instruction in the third software 426 accessed or loaded through the third control interface 422 and the third storage interface 424. Also for example, the third communication circuit 416 can be configured or set in a specific manner according to configurations or settings stored in the third storage unit 414 and accessed by the third communication interface 428, the third storage interface 424, or a combination thereof.

The third communication circuit 416 can enable external communication to and from the third device 108. For example, the third communication circuit 416 can permit the third device 108 to communicate with the second device 106, the first device 102, a different device, an attachment, such as a peripheral device or a desktop computer, the network 104, or a combination thereof.

The third communication circuit 416 can also function as a communication hub allowing the third device 108 to function as part of the network 104 and not limited to be an end point or terminal unit to the network 104. The third communication circuit 416 can include active and passive components, such as microelectronics or an antenna, for interaction with the network 104.

The third communication circuit 416 can include a baseband device or component, a modem, a digital signal processor, or a combination thereof for transmitting, formatting, receiving, detecting, decoding, further processing, or a combination thereof for communication signals. The third communication circuit 416 can include one or more portions for processing the voltages, the currents, the digital information, or a combination thereof, such as an analog-to-digital converter, a digital-to-analog converter, a filter, an amplifier, a processor-type circuitry, or a combination thereof. The third communication circuit 416 can further include one or more portions for storing information, such as cache or RAM memory, registers, or a combination thereof.

The third communication circuit 416 can include a third communication interface 428. The third communication interface 428 can be used for communication between the third communication circuit 416 and other functional units or circuits in the third device 108. The third communication interface 428 can receive information from the other functional units/circuits or can transmit information to the other functional units or circuits.

The third communication interface 428 can include different implementations depending on which functional units or circuits are being interfaced with the third communication circuit 416. The third communication interface 428 can be implemented with technologies and techniques similar to the implementation of the third control interface 422.

The third user interface 418 allows a user (not shown) to interface and interact with the third device 108. The third user interface 418 can include an input device and an output device. Examples of the input device of the third user interface 418 can include a keypad, a touchpad, soft-keys, a keyboard, a microphone, an infrared sensor for receiving remote signals, or any combination thereof to provide data and communication inputs.

The third user interface 418 can include a third display interface 430. The third display interface 430 can include an output device. The third display interface 430 can include a display, a projector, a video screen, a speaker, or any combination thereof.

The third control circuit 412 can operate the third user interface 418 to display information generated by the computing system 100. The third control circuit 412 can also execute the third software 426 for the other functions of the computing system 100, including receiving location information from the third location circuit 420. The third control circuit 412 can further execute the third software 426 for interaction with the network 104 via the third communication circuit 416.

The third location circuit 420 can generate location information, current heading, current acceleration, and current speed of the third device 108, as examples. The third location circuit 420 can be implemented in many ways. For example, the third location circuit 420 can function as at least a part of the global positioning system, an inertial computing system, a cellular-tower location system, a pressure location system, or any combination thereof. Also, for example, the third location circuit 420 can utilize components such as an accelerometer or GPS receiver.

The third location circuit 420 can include a third location interface 432. The third location interface 432 can be used for communication between the third location circuit 420 and other functional units or circuits in the third device 108. The third location interface 432 can also be used for communication external to the third device 108.

The third location interface 432 can receive information from the other functional units/circuits or from external sources, or can transmit information to the other functional units/circuits or to external destinations. The external sources and the external destinations refer to sources and destinations external to the third device 108.

The third location interface 432 can include different implementations depending on which functional units/circuits or external units/circuits are being interfaced with the third location circuit 420. The third location interface 432 can be implemented with technologies and techniques similar to the implementation of the third control circuit 412.

For illustrative purposes, the third device 108 is shown with the partition having the third user interface 418, the third storage circuit 414, the third control circuit 412, and the third communication circuit 416, although it is understood that the third device 108 can have a different partition. For example, the third software 426 can be partitioned differently such that some or all of its function can be in the third control circuit 412 and the third communication circuit 416. Also, the third device 108 can include other functional units or circuits not shown in FIG. 4 for clarity.

The functional units or circuits in the third device 108 can work individually and independently of the other functional units or circuits. The third device 108 can work individually and independently from the first device 102, the second device 106, and the network 104.

For illustrative purposes, the computing system 100 is described by operation of the first device 102 and the third device 108. It is understood that the first device 102, the second device 106, and the third device 108 can operate any of the circuits and functions of the computing system 100.

Figure 5:
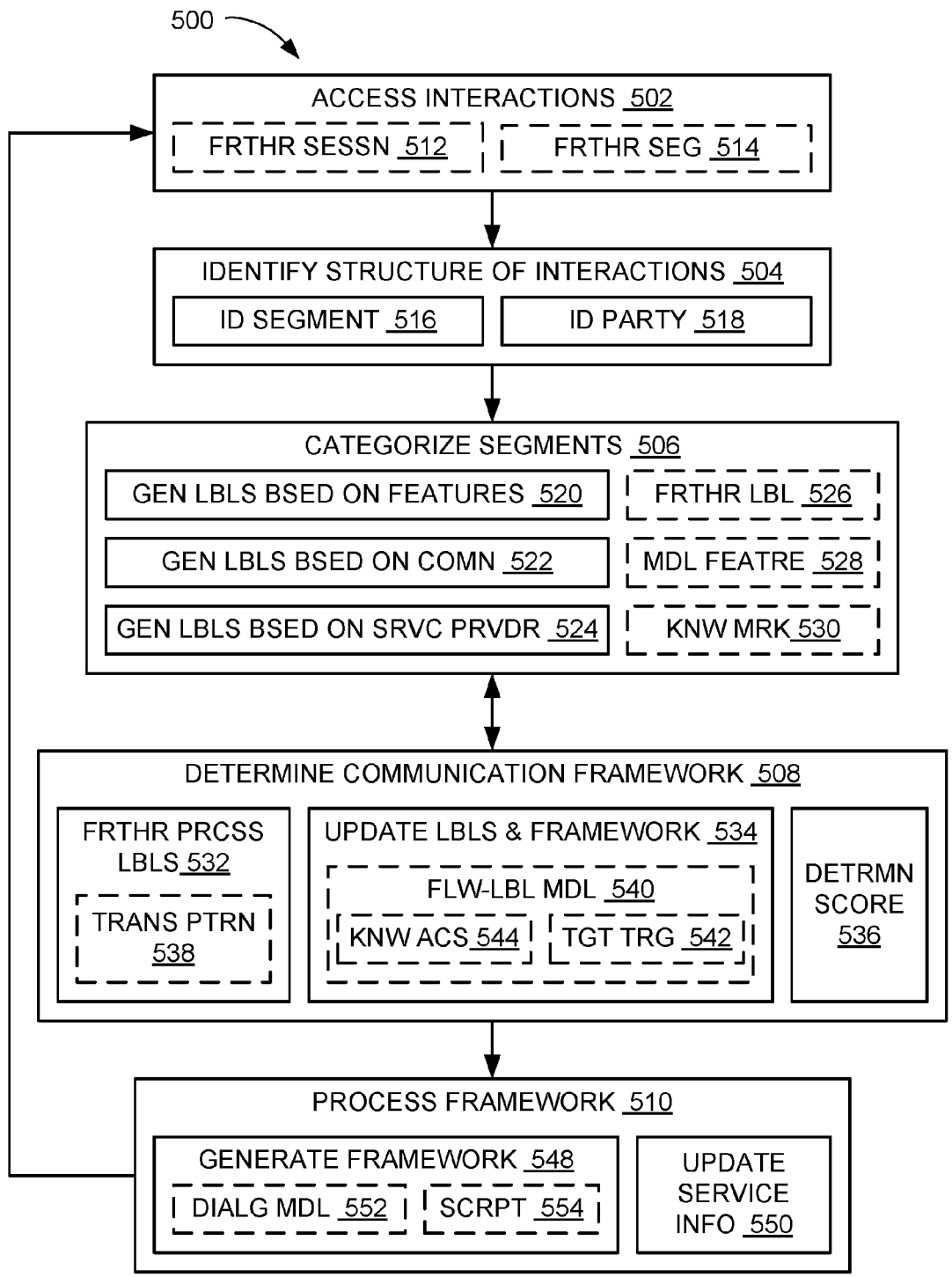
FIG. 5 is a control flow of the computing system of FIG. 1.

Referring now to FIG. 5, therein is shown a diagram 500 of the computing system 100 of FIG. 1. As an illustrative example, the computing system 100 can include a step 502, a step 504, a step 506, a step 508, a step 510, or a combination thereof.

The computing system 100 can implement the steps in sequence using wired or wireless connections between circuits, by having an output of one circuit or function as an input of the other circuit or function, by having operations of one circuit or function influence operation of the other circuit or function, or a combination thereof. The circuits or functions can be directly coupled with no intervening structure or object other than the connector there-between. The circuits or functions can further be indirectly coupled through a structure, an object, or a combination thereof other than the connector there-between.

The computing system 100 can access one or more interactions between the customer and the service provider as represented in the step 502. The computing system 100, one or more units or circuits therein, can be configured to access one or more interactions between the customer 114 of FIG. 1 and the service provider 116 of FIG. 1 for the step 502.

For the step 502, the computing system 100 can access one or more instances of the subject interaction 202 of FIG. 2 each representing an interaction or a communication session between the customer 114 and the service provider 116. The computing system 100 can access the one or more instances of the subject interaction 202 for further analysis by the computing system 100.

The computing system 100 can access the subject interaction 202 in a variety of ways. For example, the computing system 100 can access by dynamically listening on or receiving in real-time the on-going communications originated by the customer 114, the service provider 116, or a combination thereof. Also for example, the computing system 100 can access by receiving, opening, obtaining, or a combination thereof records of previously occurred communication session.

The computing system 100 can access by receiving, opening, obtaining, or a combination thereof the subject interaction 202 including text or written data. The computing system 100 can access by receiving, opening, obtaining, or a combination thereof the subject interaction 202 including verbal or audible communication. The computing system 100 can recognize content of the verbal or audible communication using speech recognition mechanism. The computing system 100 can further recognize the content using speech-to-text mechanism. The computing system 100 can update or store the text or written result of the verbal or audible communication as the subject interaction 202 for further analysis.

As an illustrative example, the computing system 100 can access one instance or multiple instances of interaction sessions, such as including one instance of the subject interaction 202 and a further session 512 as a further instance of the subject interaction 202. The multiple instances of the subject interaction 202 can represent communication sessions for the service provider 116 with multiple separate instances of the customer 114, occurring at different times, or a combination thereof.

Also as an illustrative example, the computing system 100 can access the subject interaction 202, the further session 512, or a combination thereof including one or more instances of the communication segment 204 of FIG. 2. The subject interaction 202, the further session 512, or a combination thereof can include one instance of the communication segment 204, a further segment 514 as a portion of a conversation associated with one party, one thought or concept, or a combination thereof and separate from the communication segment 204. The further segment 514 can be separate from the communication segment 204, subsequent to the communication segment 204, or a combination thereof.

The computing system 100 can use the first communication interface 328 of FIG. 3, the second communication interface 350 of FIG. 3, the third communication interface 428 of FIG. 4, the first control interface 322 of FIG. 3, the second control interface 344 of FIG. 3, the third control interface 422 of FIG. 4, the first storage interface 324 of FIG. 3, the second storage interface 348 of FIG. 3, the third storage interface 424 of FIG. 4 or a combination thereof to execute or implement the step 502. The computing system 100 can also use one or more of the interfaces listed above to access the one or more interactions as described above.

The computing system can further use the first control circuit 312 of FIG. 3, the second control circuit 334 of FIG. 3, the third control circuit 412 of FIG. 4, the first storage circuit 314 of FIG. 3, the second storage circuit 346 of FIG. 3, the third storage circuit 414 of FIG. 4, a portion thereof, or a combination thereof to execute or implement the step 502. The computing system 100 can also use the first control circuit 312, the second control circuit 334, the third control circuit 412, or a combination thereof to change the audible or verbal information into written text data. The computing system 100 can further store the interactions, results, intermediate values or a combination thereof associated with the step 502 including the written text data in the first storage circuit 314, the second storage circuit 346, the third storage circuit 414, or a combination thereof.

After accessing the one or more interactions, the control flow can pass from the step 502 to the step 504. The control flow can pass by having a processing result, such as the subject interaction 202, the further session 512, or a combination thereof, as an output from a circuit or a function to an input of another circuit or function. The control flow can further pass by storing the processing result at a location known and accessible to a circuit or a function. The control flow can further pass by notifying a specific function or circuit, such as by using a flag, an interrupt, a status signal, or a combination thereof. The control flow can further pass using a combination of the processes described above.

The computing system 100 can identify a structure of the interactions as represented in the step 504. The computing system 100, one or more units or circuits therein, can be configured to identify a structure of the interactions for the step 504.

For the step 504, the subject interaction 202, the further session 512, or a combination thereof accessed by the computing system 100 can be one or more subjects or targets of the identification process. The computing system 100 can identify the structure of the subject interaction 202, the further session 512, or a combination thereof.

The computing system 100 can identify the structure by identifying the communication segment 204, the further segment 514, the sourcing party 206 of FIG. 2 associated thereto, or a combination thereof. The step 504 can include a step 516, a step 518, or a combination thereof for identifying the structure.

The computing system 100 can identify one or more instances of the communication segment 204 within one or more interactions as represented in the step 516. The computing system 100, one or more units or circuits therein, can be configured to identify one or more instances of the communication segment 204 within one or more interactions. For example, the computing system 100 can identify the communication segment 204, the further segment 514, or a combination thereof within or from the subject interaction 202, the further session 512, or a combination thereof.

For the step 516, the computing system 100 can identify the one or more instances of the communication segment 204 in a variety of ways. For example, the computing system 100 can identify the communication segment 204, the further segment 514, or a combination thereof based on identifying a data source, an identification for a device originating the corresponding communication, a header corresponding to the communication, or a combination thereof.

Also for example, the computing system 100 can identify the communication segment 204, the further segment 514, or a combination thereof based on identifying a division or a marker, such as a return character, an end-of-line marker, a pause, or a combination thereof. In case of audio, computing system 100 can also identify based on voice frequency, pitch, or other voice characteristics. Also for example, the computing system 100 can identify the communication segment 204, the further segment 514, or a combination thereof based on identifying or distinguishing characteristics or signatures in voice or sound.

Also for example, the computing system 100 can identify the communication segment 204, the further segment 514, or a combination thereof based on recognizing one or more keywords, such as words common for greetings, topics, questions, or a combination thereof. The computing system 100 can include a set of keywords predetermined by the computing system 100 and associated with identifying the communication segment 204, the further segment 514, or a combination thereof.

The computing system 100 can use the first control circuit 312, the second control circuit 334, the third control circuit 412, or a combination thereof in identifying the one or more instances of the communication segment 204 to implement or execute the step 516. The computing system 100 can further store the one or more instances of the communication segment 204 in the first storage circuit 314, the second storage circuit 346, the third storage circuit 414, or a combination thereof for the step 516.

The computing system 100 can identify the sourcing party for or corresponding to the one or more instances of the communication segment for the step 518. The computing system 100, one or more units or circuits therein, can be configured to identify the sourcing party 206 for or corresponding to the one or more instances of the communication segment 204 for the step 518. For example, the computing system 100 can identify the sourcing party 206 for each instance of the communication segment 204, the further segment 514, or a combination thereof.

For the step 518, the computing system 100 can identify the sourcing party 206 in a variety of ways. For example, the computing system 100 can identify the sourcing party 206 based on a sequence, an order, a timing, or a combination thereof for the corresponding segment. In a specific domain, semantics of the sentences or key words can be used to identifying parties As a more specific example, the computing system 100 can identify the sourcing party 206 of a first instance of the communication segment 204 in the subject interaction 202, the further session 512, or a combination thereof as the customer 114 or the service provider 116, such as the automated communication interface 110 of FIG. 1 or the service representative 118 of FIG. 1.

Also for example, the computing system 100 can identify the sourcing party 206 based on identifying or distinguishing characteristics or signatures in voice or sound. Also for example, the computing system 100 can identify the sourcing party 206 based on recognizing one or more keywords commonly attributed to or identifying the customer 114, the service provider 116, or a combination thereof.

The computing system 100 can also use the first control circuit 312, the second control circuit 334, the third control circuit 412, or a combination thereof in identifying the sourcing party 206 corresponding to each instance of the communication segment 204 to execute or implement the step 518. The computing system 100 can store the sourcing party 206 along with corresponding instance of the communication segment 204 in the first storage circuit 314, the second storage circuit 346, the third storage circuit 414, or a combination thereof for executing or implementing the step 518.

After identifying the structure of the interactions, the control flow can pass from the step 504 to the step 506. The control flow can pass similarly as between the step 502 and the step 504 as described above, but using the processing result of the step 504, such as the communication segment 204, the further segment 514, the sourcing party 206 corresponding thereto, or a combination thereof.

The computing system 100 can group or categorize the one or more segments in the step 506. The computing system 100, one or more units or circuits therein, can be configured to categorize the one or more segments resulting from the step 504, such as including the communication segment 204, the further segment 514, or a combination thereof for the step 506.

For the step 506, the computing system 100 can categorize the one or more segments across one or more instances of the subject interaction 202, such as including the subject interaction 202, the further session 512, or a combination thereof. For example, the computing system 100 can categorize based on commonalties, patterns, similarities, or a combination thereof in the segments across multiple instances of the subject interaction 202.

The computing system 100 can categorize by generating the message label 212 of FIG. 2 for the communication segment 204. The computing system 100 can generate the message label 212 for the one or more instances of the communication segment 204. For example, the computing system 100 can generate the message label 212 corresponding to each instance of the communication segment 204, the further segment 514, or a combination thereof in the one or more instances of the subject interaction 202.

As a more specific example, the computing system 100 can generate the message label 212 for the communication segment 204, a further label 526 as a categorization corresponding to and representing the further segment 514 separate from the communication segment 204, or a combination thereof. Also as a more specific example, the computing system 100 can generate the message label 212 based on grouping or representing multiple instances of the communication segment 204 common across the multiple instances of the subject interaction 202.

The computing system 100 can generate the message label 212 for representing or categorizing an instance or a type for the communication segment 204 that is characteristic of or common for interaction between the customer 114 and the service provider 116. The computing system 100 can generate the message label 212 based on the content of the communication segment 204, corresponding instance of the sourcing party 206, or a combination thereof.

For example, the computing system 100 can generate the message label 212 based on keywords, specific type of information for the service provider 116, or a combination thereof. Also for example, the computing system 100 can generate the message label 212 including the conversation opening 220 of FIG. 2, the issue report 222 of FIG. 2, the issue acknowledgement 224 of FIG. 2, the information request 226 of FIG. 2, the instruction delivery 228 of FIG. 2, the information communication 230 of FIG. 2, the information acknowledgement 232 of FIG. 2, the solution communication 234 of FIG. 2, the solution acknowledgement 236 of FIG. 2, the conversation closing 242 of FIG. 2, or a combination thereof. Also for example, the step 506 can further include a step 520, a step 522, a step 524, or a combination thereof for generating the message label 212.

The computing system 100 can generate labels based on linguistic features as represented in the step 520. The computing system 100, one or more units or circuits therein, can be configured to generate the message label 212 based on one or more linguistic features identified within the communication segment 204 for the step 520.

For the step 520, the computing system 100 can generate the message label 212 based on the linguistic feature including n-grams, sentence structure, number of words, position of the words, keywords, accents or emphasis, change in volume for a specific word or phrase, change in rate or tone for a specific word or phrase, or a combination thereof. For example, the computing system 100 can generate the message label 212 based on one or more instances of a model-generating feature 528. The model-generating feature 528 is a linguistic feature characteristic or representative of one or more instance of the message label 212.

The model-generating feature 528 can include n-grams, sentence structure, number of words, position of the words, keywords, accents or emphasis, change in volume for a specific word or phrase, change in rate or tone for a specific word or phrase, or a combination thereof. The computing system 100 can generate the message label 212 based on one or more instances of the model-generating feature 528 including keywords common across one or more instances of the communication segment 204.

The model-generating feature 528 can include keywords or n-grams including a letter, a number, a symbol, or a combination thereof characteristic or representative of one or more instance of the message label 212. The model-generating feature 528 can be predetermined by the computing system 100 for recognizing one or more instance of the message label 212. The model-generating feature 528 can correspond to a specific label or a specific value for the message label 212.

For example, the model-generating feature 528 can include commonly known greetings associated with the conversation opening 220, the conversation closing 242, the issue report 222, or a combination thereof. Also for example, the model-generating feature 528 can include words common for questions or requests associated with the issue report 222, the information request 226, the instruction delivery 228, or a combination thereof.

Also for example, the model-generating feature 528 can include words identifying or corresponding to the service provider 116 associated with the conversation opening 220, the issue acknowledgement 224, the conversation closing 242, or a combination thereof. Also for example, the model-generating feature 528 can include relative volume profile, relative tempo profile, relative tone profile, or a combination thereof for distinguishing statements, questions, emotions, or a combination thereof. Also for example, the model-generating feature 528 can include accent or regional profile.

The model-generating feature 528 can further correspond to the sourcing party 206. For example, the model-generating feature 528 for the conversation opening 220, the issue acknowledgement 224, the information request 226, the instruction delivery 228, the information acknowledgement 232, the solution communication 234, the conversation closing 242, or a combination thereof can be associated with the service provider 116, the service-sourced message 210 of FIG. 2, or a combination thereof. Also for example, the model-generating feature 528 for the issue report 222, the information communication 230, the solution acknowledgement 236, or a combination thereof can be associated with the customer 114, the customer-sourced message 208 of FIG. 2, or a combination thereof.

The computing system 100 can include one or more instances of the model-generating feature 528, a set thereof, or a combination thereof for recognizing one or more instances of the message label 212. The computing system 100 can analyze the contents of the one or more instances of the communication segment 204. The computing system 100 can generate the message label 212 according to the model-generating feature 528 included in the contents. The computing system 100 can generate the message label 212 as a value or a label corresponding to the model-generating feature 528 included in the communication segment 204.

The computing system 100 can use the first control circuit 312, the second control circuit 334, the third control circuit 412, or a combination thereof to generate one or more instances of the message label 212 to implement or execute the step 520. The computing system 100 can store the one or more instances of the message label 212 in the first storage circuit 314, the second storage circuit 346, the third storage circuit 414, or a combination thereof for the step 520.

The computing system 100 can further access the model-generating feature 528 stored in the first storage circuit 314, the second storage circuit 346, the third storage circuit 414, or a combination thereof in implementing or executing the step 520. The computing system 100 can further use the first storage interface 324, the second storage interface 348, the third storage interface 424, or a combination thereof to access the model-generating feature 528.

The computing system 100 can generate labels based on commonalties or similarities across multiple interactions as represented in the step 522. The computing system 100, one or more units or circuits therein, can be configured to generate the message label 212 based on commonalties or similarities within instances of the communication segment 204 across multiple interactions for the step 522. For step 522, the computing system 100 can generate the message label 212 corresponding to a letter, a number, a symbol, or a combination thereof common across instances of the communication segment 204 across multiple interactions.

The computing system 100 can generate the message label 212 for representing instances of the communication segment 204 including common letter, number, symbol, or a combination thereof. The computing system 100 can generate the message label 212 using a machine-learning mechanism or a pattern recognition mechanism, data mining mechanism, statistical analysis, or a combination thereof.

For example, the computing system 100 can include a method, a process, circuitry, or a combination thereof for implementing the machine-learning mechanism or the pattern recognition mechanism, the data mining mechanism, the statistical analysis, or a combination thereof. As a more specific example, the computing system 100 can calculate a cluster, a density or a distribution, a vector, an anomaly, or a combination thereof used for the words, the numbers, or a combination thereof used in the communication segment 204, the further segment 514, or a combination thereof across sessions.

Continuing with the example, the computing system 100 can calculate corresponding weights, models, groupings, classifications, or a combination thereof for instances of the communication segment 204 including the common information. The computing system 100 can further generate the message label 212, the further label 526, or a combination thereof based on the weights, the models, the groupings, the classifications, or a combination thereof. The computing system 100 can also generate the message label 212, the further label 526, or a combination thereof based on a threshold amount of occurrences, density, distribution level, significance, or a combination thereof of letters, numbers, symbols, words, n-grams, phrases, or a combination thereof.

The computing system 100 can use the first control circuit 312, the second control circuit 334, the third control circuit 412, or a combination thereof to generate one or more instances of the message label 212 for implementing or executing the step 522. The computing system 100 can store the one or more instances of the message label 212 in the first storage circuit 314, the second storage circuit 346, the third storage circuit 414, or a combination thereof for the step 522.

The computing system 100 can generate labels based on information associated with the service provider as represented in the step 524. The computing system 100, one or more units or circuits therein, can generate the message label 212 based on information associated with the service provider 116 for the step 524. The computing system 100 can generate the message label 212 based on one or more references to a product or a service associated with the service provider 116 included in the communication segment 204.

For the step 524, the computing system 100 can generate the message label 212 based on the service information model 246 of FIG. 2. The service information model 246 can be stored in the first storage circuit 314, the second storage circuit 346, the third storage circuit 414, or a combination. The service information model 246 can be accessed using one or more of the communication circuits, one or more of the interfaces, or a combination thereof as described above for the first device 102, the second device 106, the third device 108, or a combination thereof.

For example, the computing system 100 can use the service information model 246 to identify or recognize the customer objective 120 of FIG. 1, the service solution 122 of FIG. 1 or a candidate thereof, or a combination thereof in the communication segment 204. The computing system 100 can generate the message label 212 based on the customer objective 120, the service solution 122 or a candidate thereof, or a combination thereof.

Also for example, the computing system 100 can generate the message label 212 based on identifying or recognizing content of the communication segment 204 including information or knowledge found in the service information model 246. As a more specific example, the computing system 100 can use the service information model 246 to generate the message label 212 including the issue report 222, the issue acknowledgement 224, the information request 226, the instruction delivery 228, the solution communication 234, or a combination thereof.

The computing system 100 can further generate the message label 212 including a knowledge link marker 530. The knowledge link marker 530 is a sign or an indication associated with the service information model 246.

The knowledge link marker 530 can represent a connection between the service information model 246 and an instance or value of the message label 212. The computing system 100 can generate the message label 212 including the knowledge link marker 530 for the message label 212 corresponding to a set or a grouping of the communication segment 204 including content common with or overlapping as found in the service information model 246.

The computing system 100 can use the first control circuit 312, the second control circuit 334, the third control circuit 412, or a combination thereof to generate one or more instances of the message label 212 to implement or execute the step 524. The computing system 100 can store the one or more instances of the message label 212 in the first storage circuit 314, the second storage circuit 346, the third storage circuit 414, or a combination thereof for the step 524.

It has been discovered that the message label 212 provides the categorization of the communication segment 204 common or characteristic across multiple instances of the subject interaction 202. The computing system 100 can further use the message label 212 to learn or characterize the communication between the service provider 116 and the customer 114. The computing system 100 can use the message label 212 to recognize and characterize different types of communication segments in natural communication. The computing system 100 can use the message label 212 to duplicate the natural communication, such as between people, for the automated communication interface 110.

After categorizing one or more of the segments, the control flow can pass from the step 506 to the step 508. The control flow can pass similarly as between the step 502 and the step 504 as described above, but using the processing result of the step 506, such as the message label 212, the further label 526, or a combination thereof.

The computing system 100 can determine communication framework as represented in the step 508. The computing system 100, one or more units or circuits therein, can be configured to determine the dialog-flow framework 214 of FIG. 2 for the step 508. The computing system 100 can determine the dialog-flow framework 214 based on further generating the message label 212, sequencing or arranging different instances of the message label 212, determining a condition or a preference associated with connections between instances of the message label 212, or a combination thereof.

For the step 508, the computing system 100 can determine the dialog-flow framework 214 in a variety of ways. For example, the computing system 100 can generate the dialog-flow framework 214. The computing system 100 can generate the dialog-flow framework 214 based on the message label 212, a pattern thereof across instances of the subject interaction 202, a characteristic or a trait associated thereto, or a combination thereof.

Also for example, the computing system 100 can further determine the stage of dialog-flow framework 214 based on generating or updating the message label 212 based on an initial instance of the dialog-flow framework 214. The computing system 100 can include predetermined instances of the initial instance of the dialog-flow framework 214. The computing system 100 can further receive the initial instance of the dialog-flow framework 214 resulting from the step 524.

Continuing with the example, the computing system 100 can use the initial instance of the dialog-flow framework 214 to generate, update, or complete instances of the message label 212. The computing system 100 can further arrange or sequence instances of the message label 212, determining a condition or a preference associated with connections between instances of the message label 212, or a combination thereof to update or complete the dialog-flow framework 214.

Also for example, the step 508 can further include a step 532, a step 534, a step 536, or a combination thereof for determining the dialog-flow framework 214. The computing system 100 can implement or execute the step 532, the step 534, the step 536, or a combination thereof to generate, update, complete, or a combination thereof the dialog-flow framework 214.

The computing system 100 can process labels further as represented in the step 532. The computing system 100, one or more units or circuits therein, can be configured to process the message label 212 for the step 532. The computing system 100 can process the message label 212 by further generating the message label 212, calculating or recognizing a pattern thereof, or a combination thereof.

For the step 532, the computing system 100 can further generate the message label 212 in a variety of ways. For example, the computing system 100 can further generate the message label 212 corresponding to the communication segment 204 based on a timing of the communication segment 204 relative to the further segment 514 within one instance of the subject interaction 202. Also for example, the computing system 100 can generate one or more patterns based on patterns or signatures within voice of a given person or across voices for multiple people.

Also for example, the computing system 100 can further generate the message label 212 based on the sourcing party 206 of the communication segment 204 relative to the further segment 514 within one instance of the subject interaction 202. The computing system 100 can further generate the message label 212 based on a pattern of the timing, the sourcing party 206, or a combination thereof across multiple instances of the subject interaction 202. The computing system 100 can further generate the message label 212 based on the pattern predetermined by the computing system 100 or included in the initial instance of the dialog-flow framework 214.

As a more specific example, the computing system 100 can generate the message label 212 as the issue acknowledgement 224 for the service-sourced message 210 immediately following the issue report 222. Also as a more specific example the computing system 100 can generate the message label 212 as the instruction delivery 228 for the service-sourced message 210 immediately following the information request 226, immediately preceding the information communication 230, or a combination thereof.

The computing system 100 can calculate or recognize the pattern for the message label 212 based on calculating a transition pattern 538. The transition pattern 538 is a sequence between instances of the message label 212. The transition pattern 538 can include the sequence between instances of the message label 212 common across instances of the subject interaction 202. The transition pattern 538 can further include the sequence characteristic of or representing a number or a quantity of the subject interaction 202 exceeding a threshold level predetermined by the computing system 100.

The computing system 100 can calculate the transition pattern 538 sequencing multiple instances of the message label 212, such as sequencing the message label 212 and the further label 526. For example, the computing system 100 can calculate the transition pattern 538 including one instance of the message label 212 preceding or following another instance of the message label 212. As a more specific example, the computing system 100 can calculate the transition pattern 538 directly between instances of the message label 212 or directly transitioning from one instance of the message label 212 to another instance of the message label.

The computing system 100 can calculate the transition pattern 538 using a machine-learning mechanism or a pattern recognition mechanism, data mining mechanism, statistical analysis, or a combination thereof. For example, the computing system 100 can include a method, a process, circuitry, or a combination thereof for implementing the machine-learning mechanism or the pattern recognition mechanism, the data mining mechanism, the statistical analysis, or a combination thereof. As a more specific example, the computing system 100 can calculate a cluster, a density or a distribution, a vector, an anomaly, or a combination thereof for the sequence between instances of the message label 212 across sessions.

The computing system 100 can implement or execute the step 508 or the step 532 therein along with the step 506 to further generate the message label 212, generate or update the dialog-flow framework 214, or a combination thereof. The step 508 and the step 506 can be implemented or executed using an iterative mechanism or a repetitive process for generating the message label 212, the transition patterns 538, or a combination thereof.

For example, a result or an output of the step 508 or the step 532 therein can be passed to the step 506. The computing system 100 can further generate, recognize, separate, or a combination thereof for the message label 212 based on the result or the output of the step 508 or the step 532 for the step 506.

As a more specific example, the computing system 100 can further generate the message label 212 based on recognizing keywords, based on the sourcing party 206, or a combination thereof for the communication segment 204 relative to output of the step 508. The computing system 100 can further generate the message label 212 based on whether the communication segment 204 occurs before or after the transition pattern 538 or the instances of the message label 212 generated by the step 508.

Also as a more specific example, the computing system 100 can separate the message label 212 into multiple instances of distinct values for the message label 212 corresponding to same instance of the sourcing party 206. The computing system 100 can separate one instance of the message label 212 for the service-sourced message 210 into the issue acknowledgement 224, the information request 226, instruction delivery 228, or a combination thereof.

It has been discovered that the transition pattern 538 for sequencing instances of the message label 212 provides characterization of interactions common between the service provider 116 and the customer 114. The computing system 100 can use the transition pattern 538 to learn or characterize communication exchanges between the service provider 116 and the customer 114. The computing system 100 can use the transition pattern 538 to recognize and characterize different interactions in a natural dialog. The computing system 100 can use the transition pattern 538 to represent the natural dialog for the automated communication interface 110.

The computing system 100 can use the first control circuit 312, the second control circuit 334, the third control circuit 412, or a combination thereof to generate one or more instances of the message label 212, calculate the transition pattern 538, or a combination thereof in implementing or executing the step 532. The computing system 100 can also store the one or more instances of the message label 212, calculate the transition pattern 538, or a combination thereof in the first storage circuit 314, the second storage circuit 346, the third storage circuit 414, or a combination thereof for the step 532.

The computing system 100 can further generate and update labels and framework for implementation with automated interface as represented in the step 534. The computing system 100, one or more units or circuits therein, can be configured to further generate the message label 212 and the dialog-flow framework 214 for implementation with the automated communication interface 110 for the step 534.

For the step 534, the computing system 100 can generate the message label 212 including characteristics or traits usable for recognizing the customer-sourced message 208 in real-time for the automated communication interface 110. The computing system 100 can further generate the message label 212 including information for determining and generating appropriate response by the automated communication interface 110.

For example, the computing system 100 can generate the message label 212 including a flow-label model 540. The flow-label model 540 is a characteristic, a trait, or a combination thereof for a corresponding instance of the message label 212. For example, the flow-label model 540 can include a letter, a number, a symbol, a word, a phrase, or a combination thereof characteristic of the corresponding instance of the message label 212. Also for example, the flow-label model 540 can be representative of the corresponding instance of the message label 212.

The computing system 100 can use the flow-label model 540 to recognize or identify the message label 212 for the communication segment 204 received in real-time, including the customer-sourced message 208 for the automated communication interface 110. The computing system 100 can further use the flow-label model 540 to determine a response to the communication segment 204, such as the service-sourced message 210 responding to the customer-sourced message 208 for the automated communication interface 110.

The flow-label model 540 can include a target trigger 542, a knowledge link access 544, or a combination thereof. The target trigger 542 is a letter, a number, a symbol, a word, a phrase, n-gram, sentence structure, other linguistics features, or a combination thereof characteristic of the corresponding instance of the message label 212. The target trigger 542 can include information for representing, recognizing, or categorizing the communication segment 204.

For example, the target trigger 542 can include keywords, phrases, or a combination thereof corresponding to an instance of the message label 212. Also for example, the target trigger 542 can include keywords, phrases, or a combination thereof corresponding to a subsequent or a preceding instance of the message label 212 in response to the corresponding instance of the communication segment 204.

Continuing with the example, the target trigger 542 can include information connected to or associated with another instance of the message label 212. As a more specific example, the computing system 100 can determine the target trigger 542 for transitioning from one instance of the message label 212 to another, such as from the message label 212 to a further label 526.

The computing system 100 can use the target trigger 542 to categorize or recognize the message label 212 of the customer-sourced message 208 received in real-time in implementing the automated communication interface 110. The computing system 100 can further use the target trigger 542 to determine and generate the service-sourced message 210 responding to the customer-sourced message 208 in implementing the automated communication interface 110.

The computing system 100 can determine a specific instance of the message label 212 for a subsequent communication or response based on recognizing specific information in the communication segment 204 or the message label 212 thereof. The computing system 100 can use the target trigger 542 to determine the message label 212 for the service-sourced message 210, generate a content of the service-sourced message 210 based on the determined label, or a combination thereof.

The knowledge link access 544 is a connection to, a method or a process for access, or a combination thereof the service information model 246. For example, the knowledge link access 544 can include a function call, a link, a content, or a combination thereof corresponding to the service information model 246.

The computing system 100 can generate the message label 212 including the knowledge link access 544 for referencing the service information model 246 to generate the service solution 122 addressing the customer objective 120. The computing system 100 can generate the message label 212 including the knowledge link access 544 based on the knowledge link marker 530. The computing system 100 can replace the knowledge link access 544 with the knowledge link marker 530.

For example, the computing system 100 can generate the issue report 222, the issue acknowledgement 224, the information acknowledgement 232, the solution communication 234, the solution acknowledgement 236, or a combination thereof including the knowledge link access 544. As a more specific example, the computing system 100 can generate the message label 212 including the knowledge link access 544 for accessing and searching the service information model 246, such as for recognizing incoming information or determining corresponding responsive information.

It has been discovered that the target trigger 542 determined from the subject interaction 202 provides characterization of reasons or motivations initiating reactions or communications between the service provider 116 and the customer 114. The computing system 100 can use the target trigger 542 to learn or characterize reasons or motivations for a specific reaction or communication between the service provider 116 and the customer 114. The computing system 100 can use the target trigger 542 to recognize and characterize reasons or motivations for different interactions in a natural dialog. The computing system 100 can use the target trigger 542 to implement the natural dialog for the automated communication interface 110.

The computing system 100 can use the first control circuit 312, the second control circuit 334, the third control circuit 412, or a combination thereof to generate the flow-label model 540 or the message label 212 including the flow-label model 540 in implementing or executing the step 534. The computing system 100 can store the flow-label model 540 or the message label 212 including the flow-label model 540 in the first storage circuit 314, the second storage circuit 346, the third storage circuit 414, or a combination thereof for the step 534.

The computing system 100 can determine transition score for transitioning between labels as represented in the step 536. The computing system 100, or one or more units or circuits therein, can be configured to determine the transition score 244 of FIG. 2 for the step 536. The computing system 100 can determine the transition score 244 for representing a transition or a connection between instances of the message label 212, such as between the message label 212 and the further label 526.

For the step 536, the computing system 100 can determine the transition score 244 based on accessing the transition score 244, calculating the transition score 244, or a combination thereof. The computing system 100 can access one or more instances of the transition score 244 corresponding to one or more specific instances of the transition pattern 538 as predetermined by the computing system 100.

The computing system 100 can calculate the transition score 244 for the transition pattern 538 between instances of the message label 212. The computing system 100 can calculating the transition score 244 in a variety of ways.

For example, the computing system 100 can calculate the transition score 244 corresponding to the transition pattern 538 between instances of the message label 212. Also for example, the computing system 100 can calculate the transition score 244 based on conditional probabilistic of a specific transition from a particular state.

Also for example, the computing system 100 can calculate the transition score 244 based on a number of outcomes for the issue unresolved status 240 of FIG. 2, a number or a type of repeated instances of the message label 212 until the issue solved status 238 of FIG. 2, a quantity of the message label 212 until the issue solved status 238, or a combination thereof within each instance of the subject interaction 202. Also for example, the computing system 100 can calculate the transition score 244 based on the message label 212 at a start, at an end, or a combination thereof for the transition pattern 538.

As a more specific example, the computing system 100 can calculate the transition score 244 as 1 for the transition pattern 538 corresponding to directly resulting in the issue solved status 238, corresponding to the issue solved status 238 without repeating the message label 212 within each instance of the subject interaction 202. Also as a more specific example, the computing system 100 can also calculate the transition score 244 as less than 1 for the transition pattern 538 corresponding to repeating the message label 212, going away from the solution communication 234 or the issue solved status 238, corresponding to the issue unresolved status 240, or a combination thereof.

Also as a more specific example, the computing system 100 can calculate the transition score 244 according to the message label 212 at the start, at the end, or a combination thereof for the transition pattern 538. The computing system 100 can include an equation, a process, a mechanism, or a combination thereof predetermined by the computing system 100 for calculating the transition score 244. The computing system 100 can further include a weight, an equation, an adjustment, a pattern, or a combination thereof predetermined by the computing system 100 corresponding to different instances of the start, the end, or a combination thereof for possible instances of the transition pattern 538.

It has been discovered that the transition score 244 corresponding to the transition pattern 538 provides improved customer experience for the computing system 100. The transition score 244 can quantify a desirability or a significance for evaluating interactions common between the service provider 116 and the customer 114, and provide more flexibility of workflow generation in domains like customer service. The computing system 100 can use the transition score 244 to learn or characterize a desirability or a significance for exchanges in dialog between the service provider 116 and the customer 114. The computing system 100 can use the transition score 244 to recognize and characterize a desirability or a significance in different interactions in a natural dialog. The computing system 100 can use the transition score 244 to implement the natural dialog for the automated communication interface 110.

The computing system 100 can use the first control circuit 312, the second control circuit 334, the third control circuit 412, or a combination thereof to generate the message label 212 including the transition score 244 for implementing or executing the step 536. The computing system 100 can store the message label 212 including the transition score 244 in the first storage circuit 314, the second storage circuit 346, the third storage circuit 414, or a combination thereof for the step 536.

After categorizing one or more of the segments, the control flow can pass from the step 508 to the step 510. The control flow can pass similarly as between the step 502 and the step 504 as described above, but using the processing result of the step 508, such as the message label 212, the transition pattern 538, the flow-label model 540, or a combination thereof.

The computing system 100 can process the framework for the automated interface as represented in the step 510. The computing system 100, or one or more units or circuits therein, can be configured to process the dialog-flow framework 214 for the automated communication interface 110 for the step 510. The step 510 can include a step 548, a step 550, or a combination thereof for processing the dialog-flow framework 214.

The computing system 100 can generate the framework as represented in the step 548. The computing system 100, or one or more units or circuits therein, can be configured to generate the dialog-flow framework 214. The computing system 100 can generate the dialog-flow framework 214 for representing or characterizing one or more instances of the subject interaction 202.

For the step 548, the computing system 100 can generate the dialog-flow framework 214 for representing or characterizing a pattern or a commonality in the subject interaction 202 that have occurred in the past, such as between the customer 114 and the service representative 118, the automated communication interface 110, or a combination thereof. The computing system 100 can generate the dialog-flow framework 214 for application or implementation with the automated communication interface 110 in communicating with the customer 114, addressing the customer objective 120, or a combination thereof.

The computing system 100 can generate the dialog-flow framework 214 based on the transition pattern 538. The computing system 100 can generate the dialog-flow framework 214 based on sequencing multiple instances of the message label 212 according to one or more instances of the transition pattern 538.

The computing system 100 can generate the dialog-flow framework 214 based on a sequence, an order, a reference point, or a combination thereof predetermined by the computing system 100 for instances of the message label 212. The computing system 100 can further include a process, a mechanism, an equation, or a combination thereof predetermined by the computing system 100 for processing the transition pattern 538, for sequencing multiple values of the message label 212, or a combination thereof, to generate the dialog flow framework 214.

The computing system 100 can generate the dialog-flow framework 214 including the transition score 244 between the message label 212 and the further label 526. The computing system 100 can generate the dialog-flow framework 214 including the transition score 244 corresponding to the transition pattern 538 linking the message label 212 and the further label 526.

The computing system 100 can further generate the dialog-flow framework 214 based on the flow-label model 540. The computing system 100 can generate the dialog-flow framework 214 including the target trigger 542, the knowledge link access 544, or a combination thereof corresponding to one or more instances of the message label 212.

The computing system 100 can generate the dialog-flow framework 214 including the target trigger 542 for identifying or recognizing the message label 212, such as for the customer-sourced message 208, for the automated communication interface 110. The computing system 100 can generate the dialog-flow framework 214 including the target trigger 542 such as keywords or phrases for identifying or recognizing the message label 212 in real-time for the automated communication interface 110.

The computing system 100 can generate the dialog-flow framework 214 including the target trigger 542 for transitioning from the message label 212 to the further label 526. The computing system 100 can generate the dialog-flow framework 214 including the target trigger 542 for selecting or determining the further label 526 for transitioning from the message label 212.

The computing system 100 can generate the dialog-flow framework 214 including the target trigger 542 for selecting or determining the further label 526 corresponding to the service-sourced message 210 responding to the customer-sourced message 208. The computing system 100 can generate the dialog-flow framework 214 including the target trigger such as keywords or phrases for selecting or determining the further label 526 immediately following the message label 212 in real-time for the automated communication interface 110.

The computing system 100 can generate a dialog model 552 for the automated communication interface 110. The dialog model 552 can include potential instances of the service-sourced message 210 for the automated communication interface 110.

The dialog model 552 can include a mechanism for recognizing the message label 212 for the customer-sourced message 208. The dialog model 552 can include a mechanism for determining the further label 526 for the service-sourced message 210. The dialog model 552 can further include actual content for the service-sourced message 210 corresponding to the determined instance of the further label 526 in response to the customer-sourced message 208.

The computing system 100 can generate the dialog model 552 based on the dialog-flow framework 214 for implementing the automated communication interface 110 for the service provider 116. The computing system 100 can generate the dialog model 552 based on determining a label-interface script 554 corresponding to the dialog-flow framework 214, the message label 212 therein, or a combination thereof.

The label-interface script 554 can include the actual content for the service-sourced message 210. The label-interface script 554 can correspond to specific instance of the message label 212, the transition pattern 538, or a combination thereof. The label-interface script 554 can include written texts, sounds, or a combination thereof for communicating the service-sourced message 210 to the customer 114 for the automated communication interface 110.

The computing system 100 can access the label-interface script 554 predetermined by the computing system 100 for specific instance of the message label 212, the transition pattern 538, or a combination thereof. The computing system 100 can further generate the label-interface script 554 based on a keyword, a phrase, or a combination thereof common for corresponding instance of the message label 212 across instances of the subject interaction 202.

The computing system 100 can generate the dialog model 552 based on the dialog-flow framework 214 including the dialog-flow framework 214 and corresponding instance of the label-interface script 554. The computing system 100 can generate the dialog model 552 including multiple instance of the label-interface script 554 for one or more instances of the message label 212 corresponding to or contingent on the message label 212, the transition pattern 538, or a combination thereof.

The computing system can use the first control circuit 312, the second control circuit 334, the third control circuit 412, or a combination thereof in generating the dialog model 552, the dialog-flow framework 214, or a combination thereof to implement or execute the step 548. The computing system 100 can store the dialog model 552, the dialog-flow framework 214, or a combination thereof in the first storage circuit 314, the second storage circuit 346, the third storage circuit 414, or a combination thereof for the step 548.

The computing system 100 can update the service information based on the interactions as represented in the step 550. The computing system 100, or one or more units or circuits therein, can be configured to adjust or update the service information model 246 based on analyzing one or more instances of the subject interaction 202 for the step 550. The computing system 100 can adjust the service information model 246 based on the message label 212, the further label 526, the transition pattern 538, the transition score 244, the issue solved status 238, the issue unresolved status 240, or a combination thereof.

For the step 550, the computing system 100 can adjust or update the service information model 246 based on adjusting connections or association between data. For example, the computing system 100 can adjust or update connection or association between data provided as the service solution 122 in response to the customer objective 120 according to the existing instance of the service information model 246.

Continuing with the example, the computing system 100 can increase or strengthen the connection or association based on the issue solved status 238 subsequently following the service solution 122 without any repeats in the message label 212 or the issue unresolved status 240 in the subject interaction 202. The computing system 100 can otherwise decrease or weaken the connection or association based on the issue unresolved status 240 subsequently following the service solution 122 in the subject interaction 202.

Similarly, the computing system 100 can adjust or update the service information model 246 based on establishing new connections or based on removing existing connections. Further, the computing system 100 can add new data points.

For example, the computing system 100 can include predetermined thresholds for establishing new connections, removing existing connections, or a combination thereof. The computing system 100 can track statistics for the issue solved status 238 and provided answers. The computing system 100 can establish new connections, remove existing connections, or a combination thereof based on comparing the statistics to the predetermined thresholds.

Also for example, the computing system 100 can include predetermined threshold for adding a new data point. The computing system 100 can track an occurrence, a frequency, or a combination thereof for finding new data points, keywords, n-grams, or a combination thereof. The computing system 100 can recognize and add the new data point when the occurrence, the frequency, or a combination thereof satisfies the thresholds.

It has been discovered that adjusting or updating the service information model 246 based on the subject interaction 202 provides improved accuracy in the service solution 122 and the service information model 246. The computing system 100 can dynamically correct errors or deficiencies in the service information model 246 using feedback from the customer 114 through the subject interaction 202.

The computing system 100 can use the first control circuit 312, the second control circuit 334, the third control circuit 412, or a combination thereof in adjusting or updating the service information model 246 to implement or execute the step 550. The computing system 100 can store the adjusted instance of the service information model 246 in the first storage circuit 314, the second storage circuit 346, the third storage circuit 414, or a combination thereof for the step 550.

After processing the dialog-flow framework 214, the control flow can pass from the step 510 to the step 502. The control flow can pass similarly as between the step 502 and the step 504 as described above, but using the processing result of the step 510, such as the dialog-flow framework 214, the dialog model 552, or a combination thereof.

The computing system can utilize the dialog-flow framework 214, the dialog model 552, or a combination thereof to implement the automated communication interface 110 in repeating the step 502. The computing system 100 can further use the application of the automated communication interface 110 implementing the dialog-flow framework 214, the dialog model 552, or a combination thereof to further access additional interactions between the customer 114 and the service provider 116.

The computing system 100 can further implement or execute the step 506, the step 508, the step 510, or a combination thereof to generate the dialog-flow framework 214 as a skeleton or a flow. The computing system 100 can generate the dialog model 552 based on adding the label-interface script 554, the flow-label model 540, or a combination thereof to one or more instances of the message label 212 in the dialog-flow framework 214.

The computing system 100 can further implement or execute the step 506, the step 508, the step 510, or a combination thereof with a structure, a transition, a label, or a combination thereof predetermined by the computing system 100 as an outline for the dialog-flow framework 214. The computing system 100 can implement or execute the steps 506, 508, 510, or a combination thereof to adjust, update, add, or a combination thereof as described above in generating the dialog-flow framework 214.

The computing system 100 can use the dialog model 552, the label-interface script 554, the dialog-flow framework 214, or a combination thereof to implement the automated communication interface 110. The computing system 100 can dynamically receive the customer-sourced message 208 generated by the customer 114 and incoming to the service provider 116. The computing system 100 can dynamically identify the message label 212 as the customer-sourced message 208 is received.

The computing system 100 can use the dialog-flow framework 214 to determine an instance or a value of the message label 212 appropriate for following or responding to the message label 212 of the incoming communication. The computing system 100 can use the determined responding instance of the message label 212 to generate the service-sourced message 210 for responding to the customer-sourced message 208.

The computing system 100 can further use the dialog model 552, the label-interface script 554, or a combination thereof according to the determined responding instance of the message label 212 to generate the service-sourced message 210. The computing system 100 can communicate the service-sourced message 210 to the customer 114.

The computing system 100 can further analyze one or more instances of the customer-sourced message 208 in real-time to determine the customer objective 120. The computing system 100 can interact with the customer 114 through the automated communication interface 110 using the dialog model 552, the label-interface script 554, the dialog-flow framework 214, or a combination thereof in gathering further information.

The computing system 100 can further generate the service solution 122 using the information from the service information model 246 according to the dialog-flow framework 214. The computing system 100 can generate the service-sourced message 210 including the service solution 122 for addressing the customer objective 120. The computing system 100 can communicate the service-sourced message 210 including the service solution 122 to the customer 114.

It has been discovered that the dialog-flow framework 214 based on the message label 212 for representing one or more instances of the subject interaction 202 provides an increased accuracy in modeling human interactions. The dialog-flow framework 214 based on the message label 212 can characterize types of communications for multiple instances of the subject interaction 202. The computing system 100 can use the dialog-flow framework 214 based on the message label 212 for the automated communication interface 110 to duplicate the types of communications.

It has further been discovered that the dialog-flow framework 214 generated based on the transition pattern 538 provides an increased fluidity in modeling human interactions. The dialog-flow framework 214 based on the transition pattern 538 can characterize patterns in communications for multiple instances of the subject interaction 202. The computing system 100 can use the dialog-flow framework 214 based on the transition pattern 538 for the automated communication interface 110 to duplicate the patterns of communications.

It has further been discovered that the dialog-flow framework 214 including the transition score 244 provides an increased accuracy in addressing the customer objective 120. The dialog-flow framework 214 including the transition score 244 can characterize a desirability or a significance associated with information appropriate for the service-sourced message 210. The computing system 100 can generate the service-sourced message 210 based on the transition score 244 for addressing the customer-sourced message 208.

The physical transformation from the dialog-flow framework 214, such as changes or updates to the instances of the message label 212, results in the movement in the physical world, such as physical change in information communicated for the customer 114. Movement in the physical world results in updates to the subject interaction 202, which can be fed back into the computing system 100 and adjust the service information model 246, the dialog model 552, or a combination thereof.

Figure 6:
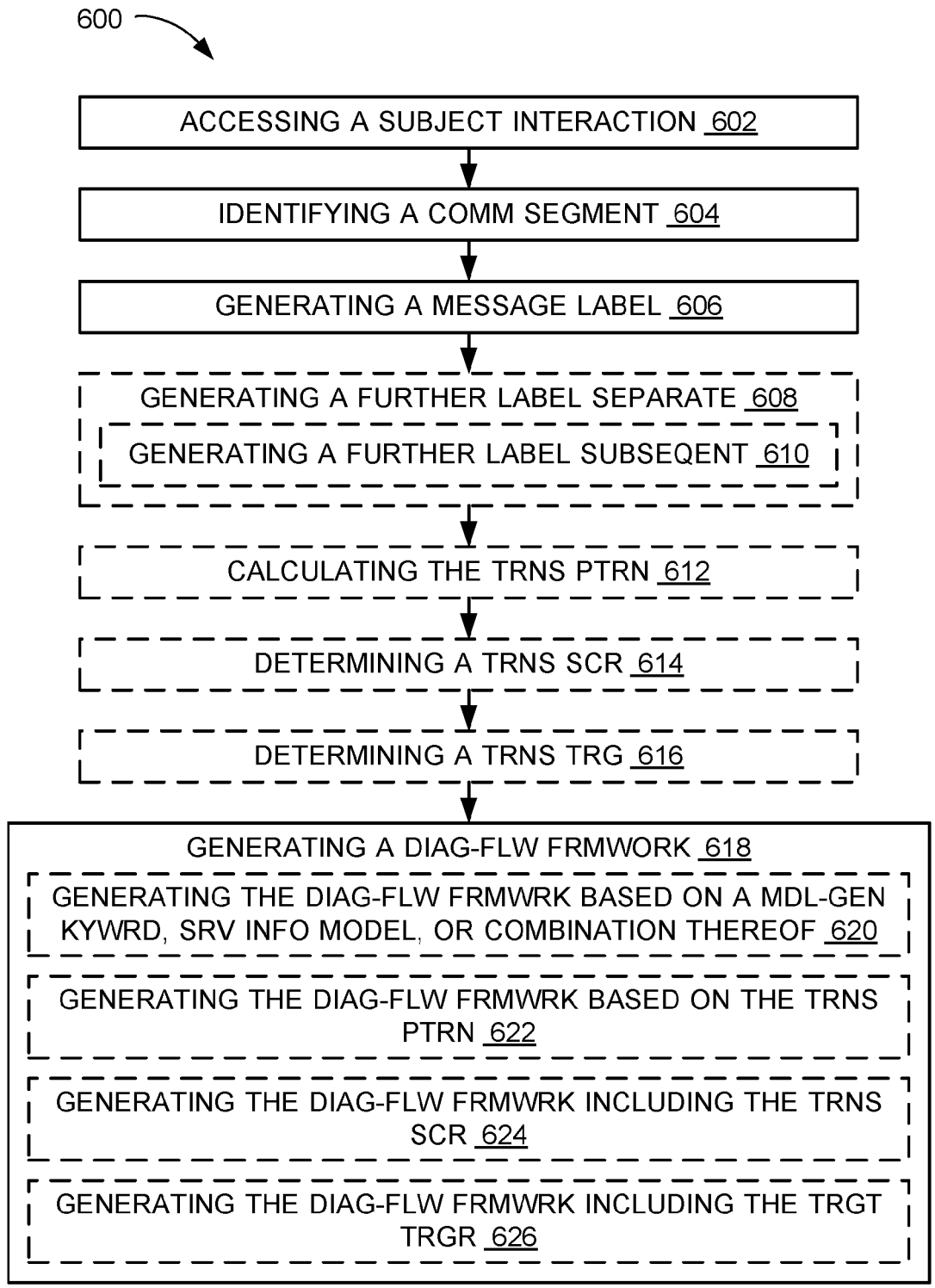
FIG. 6 is an exemplary flow chart of a method of operation of the computing system of FIG. 1 in a further embodiment.

Referring now to FIG. 6, therein is shown an exemplary flow chart of a method 600 of operation of the computing system 100 of FIG. 1 in a further embodiment. The exemplary flow chart 600 can include accessing a subject interaction representing communication between a customer and a service provider at step 602. The computing system 100 can implement or execute the step 502 of FIG. 5 as described above to access one or more instances of the subject interaction 202 of FIG. 2 representing communication between the customer 114 of FIG. 1 and the service provider 116 of FIG. 1.

The exemplary flow chart 600 can include identifying a communication segment and a sourcing party associated with the communication segment from the subject interaction at step 604. The computing system 100 can implement or execute the step 504 of FIG. 5 as described above to identify the communication segment 204 of FIG. 2 and the sourcing party 206 of FIG. 2.

The exemplary flow chart 600 can include generating a message label for the communication segment based on the sourcing party at step 606. The computing system 100 can implement or execute the step 506 of FIG. 5 as described above to generate the message label 212 of FIG. 2.

The exemplary flow chart 600 can include generating a further label representing a further segment separate from the communication segment for the subject interaction at a step 608. The exemplary flow chart 600 can include generating a further label representing a further segment subsequent to the communication segment of the subject interaction at a step 610. The step 608 can include the step 610. The computing system 100 can further implement or execute the step 506 as described above to generate the further label 526 of FIG. 5 for the step 608, the step 610, or a combination thereof.

The exemplary flow chart 600 can include calculating the transition pattern connecting the message label and the further label at step 612. The computing system 100 can implement or execute the step 508 of FIG. 5 as described above to calculate the transition pattern 538 of FIG. 5.

The exemplary flow chart 600 can include determining a transition score for connecting the message label and the further label at step 614. The computing system 100 can implement or execute the step 508 as described above to determine the transition score 244 of FIG. 2.

The exemplary flow chart 600 can include determining a target trigger for transitioning from the message label to the further label at step 616. The computing system 100 can implement or execute the step 508 as described above to determine the target trigger 542 of FIG. 5.

The exemplary flow chart 600 can include generating a dialog-flow framework based on the message label for representing the subject interaction at step 618. The exemplary flow chart 600 can include generating the dialog-flow framework based on a model-generating keyword, a service information model, or a combination thereof at step 620. The exemplary flow chart 600 can include generating the dialog-flow framework based on the transition pattern at step 622.

The exemplary flow chart 600 can include generating the dialog-flow framework including the transition score at step 624. The exemplary flow chart 600 can include generating the dialog-flow framework including the target trigger at step 626.

The step 618 can include the step 620, the step 622, the step 624, the step 626, or a combination thereof. The computing system 100 can implement or execute the step 508, the step 510 of FIG. 5, or a combination thereof as described above to generate the dialog-flow framework 214 of FIG. 2 for the step 618, the step 620, the step 622, the step 624, the step 626, or a combination thereof.

The circuits, units, functions, or a combination thereof described herein can be hardware implementation or hardware accelerators, including passive circuitry, active circuitry, or both, in the first control circuit 312 of FIG. 3, the second control circuit 334 of FIG. 3, the third control circuit 412 of FIG. 4, or a combination thereof. The circuits, units, functions, or a combination thereof can also be hardware implementation or hardware accelerators, including passive circuitry, active circuitry, or both, within the first device 102 of FIG. 1, the second device 106 of FIG. 1, the third device 108 of FIG. 1, or a combination thereof but outside of the first control circuit 312, the second control circuit 334, the third control circuit 412, or a combination thereof.

The computing system 100 has been described with circuits, steps, functions or order as an example. The computing system 100 can partition the circuits or steps differently or order the circuits or steps differently. For example, the step 502 can be combined with the step 504. Also for example, the step 532 of FIG. 5, the step 534 of FIG. 5, the step 536 of FIG. 5, or a combination thereof can be separate from the step 508, precede or follow the step 508, or a combination thereof.

For illustrative purposes, the various circuits, functions, steps, or a combination thereof have been described as being specific to the first device 102, the second device 106, the third device 108, or a combination thereof. However, it is understood that the circuits, functions, steps, or a combination thereof can be distributed differently. For example, the various circuits, functions, steps, or a combination thereof can be implemented in a different device, or the functionalities of the circuits, functions, steps, or a combination thereof can be distributed across multiple devices. Also as an example, the various circuits, functions, steps, or a combination thereof can be stored in a non-transitory memory medium.

As a more specific example, one or more functions, steps, or a combination thereof described above can be stored in the non-transitory memory medium for distribution to a different system, a different device, a different user, or a combination thereof. Also as a more specific example, the functions or steps described above can be implemented or stored using a single hardware unit or circuit, such as a chip or a processor, or across multiple hardware units or circuits.

The functions or steps described in this application can be stored in the non-transitory computer readable medium. The first storage circuit 314 of FIG. 3, the second storage circuit 346 of FIG. 3, the third storage circuit 414 of FIG. 4, or a combination thereof can represent the non-transitory computer readable medium. The first storage circuit 314, the second storage circuit 346, the third storage circuit 414, or a combination thereof, or a portion therein can be removable from the first device 102, the second device 106, the third device 108, or a combination thereof. Examples of the non-transitory computer readable medium can be a non-volatile memory card or stick, an external hard disk drive, a tape cassette, or an optical disk.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
a control circuit configured to:
access a subject interaction representing communication between a customer and a service provider, wherein the communication comprises a textual or linguistic communication via an electronic medium,
parse the communication to identify a communication segment and a sourcing party associated with the communication segment from the subject interaction,
generate a message label for the communication segment based on one of a categorization or classification of the communication segment, and
generate a dialog-flow framework based on the message label for representing the subject interaction, wherein the dialog-flow framework comprises a set of patterns representing one or more communications between the customer and the service provider; and
a storage circuit, coupled to the control circuit, configured to store the dialog-flow framework.

2. The computing system as claimed in claim 1 wherein the control circuit is configured to generate the message label based on a model-generating keyword, a service information model, or a combination thereof.

3. The computing system as claimed in claim 1 wherein the control circuit is configured to:
calculate a transition pattern connecting the message label and a further label;
generate the further label representing a further segment distinctive from the communication segment of the subject interaction; and
generate the dialog-flow framework based on the transition pattern.

4. The computing system as claimed in claim 1 wherein the control circuit is configured to:
determine a transition score for connecting the message label and a further label;
generate the further label representing a further segment subsequent to the communication segment of the subject interaction; and
generate the dialog-flow framework including the transition score.

5. The computing system as claimed in claim 1 wherein the control circuit is configured to:
determine a target trigger for transitioning from the message label to a further label;
generate the further label representing a further segment subsequent to the communication segment of the subject interaction; and
generate the dialog-flow framework including the target trigger.

6. The computing system as claimed in claim 1 wherein the control circuit is configured to:
access multiple instances of the subject interaction representing communications with multiple separate instances of the customer at different times for the service provider;

generate the dialog-flow framework based on sequencing multiple values of the message label for characterizing the multiple instances of the subject interaction; and generate a dialog model based on the dialog-flow framework for implementing an automated communication interface for the service provider.

7. The computing system as claimed in claim 6 wherein the control circuit is configured to generate the message label based on grouping multiple instances of the communication segment across the multiple instances of the subject interaction.

8. The computing system as claimed in claim 6 wherein the control circuit is configured to generate the message label including a knowledge link access for referencing a service information model to generate a service solution addressing a customer objective.

9. The computing system as claimed in claim 6 wherein the control circuit is configured to generate the message label including an issue acknowledgement, an information request, a solution communication, a solution acknowledgement, or a combination thereof.

10. The computing system as claimed in claim 6 wherein the control circuit is configured to:

generate a further label representing a further segment distinctive from the communication segment of the subject interaction; and adjust a service information model based on the further label.

11. A method of operation of a computing system comprising:

accessing a subject interaction representing communication between a customer and a service provider, wherein the communication comprises a textual or linguistic communication via an electronic medium;

parsing the communication to identify a communication segment and a sourcing party associated with the communication segment from the subject interaction;

generating a message label for the communication segment based on one of a categorization or classification of the communication segment; and generating with a control circuit a dialog-flow framework based on the message label for representing the subject interaction, wherein the dialog-flow framework comprises a set of patterns representing one or more communications between the customer and the service provider.

12. The method as claimed in claim 11 wherein generating the dialog-flow framework includes generating the dialog-flow framework based on a model-generating keyword, a service information model, or a combination thereof.

13. The method as claimed in claim 11 further comprising:

generating a further label representing a further segment distinctive from the communication segment of the subject interaction; and calculating a transition pattern connecting the message label and the further label, and wherein generating the dialog-flow framework includes generating the dialog-flow framework based on the transition pattern.

14. The method as claimed in claim 11 further comprising:

generating a further label representing a further segment subsequent to the communication segment of the subject interaction; and determining a transition score for connecting the message label and the further label, and wherein generating the dialog-flow framework includes generating the dialog-flow framework including the transition score.

15. The method as claimed in claim 11 further comprising:

generating a further label representing a further segment subsequent to the communication segment of the subject interaction; and determining a target trigger for transitioning from the message label to the further label, and wherein generating the dialog-flow framework includes generating the dialog-flow framework including the target trigger.

16. A non-transitory computer readable medium including instructions that, when executed by a processor, are configured to cause the processor to:

access a subject interaction representing communication between a customer and a service provider, wherein the communication comprises a textual or linguistic communication via an electronic medium;

parse the communication to identify a communication segment and a sourcing party associated with the communication segment from the subject interaction;

generate a message label for the communication segment based one of a categorization or classification of the communication segment; and generate a dialog-flow framework based on the message label for representing the subject interaction, wherein the dialog-flow framework comprises a set of patterns representing one or more communications between the customer and the service provider.

17. The non-transitory computer readable medium as claimed in claim 16, wherein the instructions are further configured to cause the processor to generate the dialog-flow framework based on a model-generating keyword, a service information model, or a combination thereof.

18. The non-transitory computer readable medium as claimed in claim 16, wherein the instructions are further configured to cause the processor to:

generate a further label representing a further segment distinctive from the communication segment of the subject interaction;

calculate a transition pattern connecting the message label and the further label; and generate the dialog-flow framework based on the transition pattern.

19. The non-transitory computer readable medium as claimed in claim 16, wherein the instructions are further configured to cause the processor to:

generate a further label representing a further segment subsequent to the communication segment of the subject interaction;

determine a transition score for connecting the message label and the further label, and generate the dialog-flow including the transition score.

20. The non-transitory computer readable medium as claimed in claim 16, wherein the instructions are further configured to cause the processor to:

generate a further label representing a further segment subsequent to the communication segment of the subject interaction; and determine a target trigger for transitioning from the message label to the further label, and generate the dialog-flow including the target trigger.

* * * * *